United States Patent
Boudville

(10) Patent No.: US 11,770,420 B2
(45) Date of Patent: Sep. 26, 2023

(54) GHOST SPIDERS AND ZOMBIE AVATARS IN THE METAVERSE

(71) Applicant: Wesley John Boudville, Perth (AU)

(72) Inventor: Wesley John Boudville, Perth (AU)

( * ) Notice: Subject to any disclaimer, the term of this patent is extended or adjusted under 35 U.S.C. 154(b) by 0 days.

(21) Appl. No.: 17/803,238

(22) Filed: Jan. 20, 2022

(65) Prior Publication Data

US 2023/0231892 A1     Jul. 20, 2023

(51) Int. Cl.
*G06V 20/52* (2022.01)
*H04L 65/1093* (2022.01)
*G06T 13/40* (2011.01)
*G06V 20/64* (2022.01)

(52) U.S. Cl.
CPC .......... *H04L 65/1093* (2013.01); *G06T 13/40* (2013.01); *G06V 20/52* (2022.01); *G06V 20/64* (2022.01)

(58) Field of Classification Search
CPC . A63F 2300/5586; A63F 13/75; H04L 67/131
See application file for complete search history.

(56) References Cited

U.S. PATENT DOCUMENTS

| | | | |
|---|---|---|---|
| 2009/0144267 A1* | 6/2009 | Cook | G06F 3/011 707/999.005 |
| 2009/0241049 A1* | 9/2009 | Bates | H04L 67/131 715/771 |
| 2014/0019916 A1* | 1/2014 | Paz | G06F 3/04842 715/848 |
| 2015/0046219 A1* | 2/2015 | Shavlik | G06Q 30/0203 705/7.31 |
| 2015/0235447 A1* | 8/2015 | Abovitz | G16H 40/67 345/633 |
| 2016/0148412 A1* | 5/2016 | Shuster | G06T 19/006 715/757 |
| 2019/0099653 A1* | 4/2019 | Wanke | G06Q 50/01 |
| 2019/0188226 A1* | 6/2019 | Cheng | A63F 13/335 |
| 2020/0250876 A1* | 8/2020 | Shuster | A63F 13/50 |
| 2022/0032199 A1* | 2/2022 | Rudi | G06F 18/24 |
| 2023/0014321 A1* | 1/2023 | Nair | A63F 13/79 |

* cited by examiner

*Primary Examiner* — John R Schnurr
*Assistant Examiner* — Frank Johnson

(57) ABSTRACT

Spiders scans websites. A ghost spider scans VR/Metaverse "rooms". The ghost spider does not use an avatar to represent itself when it visits rooms. It has no visible presence to avatars. A ghost spider can follow an avatar, documenting its activities. A room can have policies on forbidden items for avatars. Two common problems with rooms are (a) unauthorised use of trademarks; (b) when users with avatars visit a room, (zombie) avatars often remain logged in and static, as their users do other tasks. The room falsely benefits in attendance numbers with zombies present. Our specification attacks both problems.

4 Claims, 16 Drawing Sheets

Look for zombie avatars

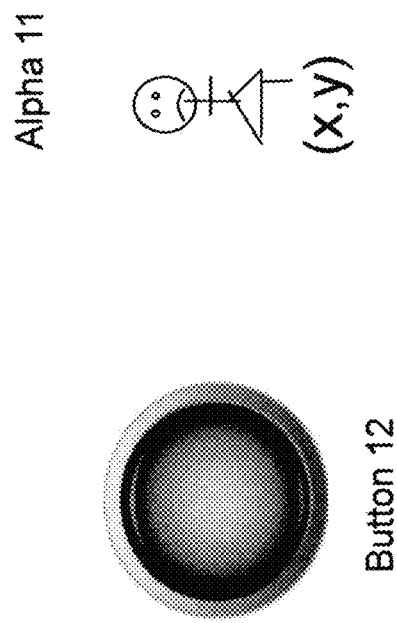

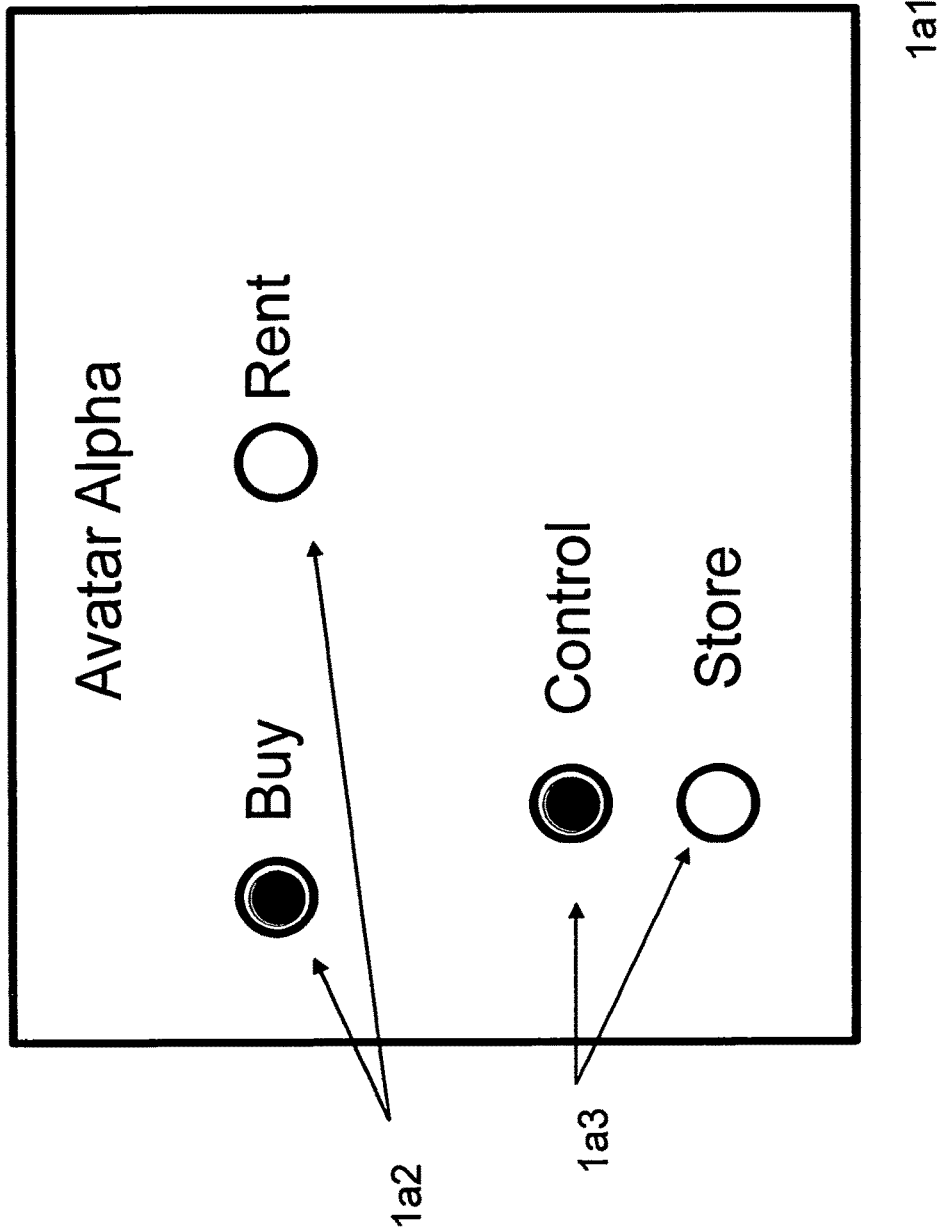
Figure 1A  Have a new avatar

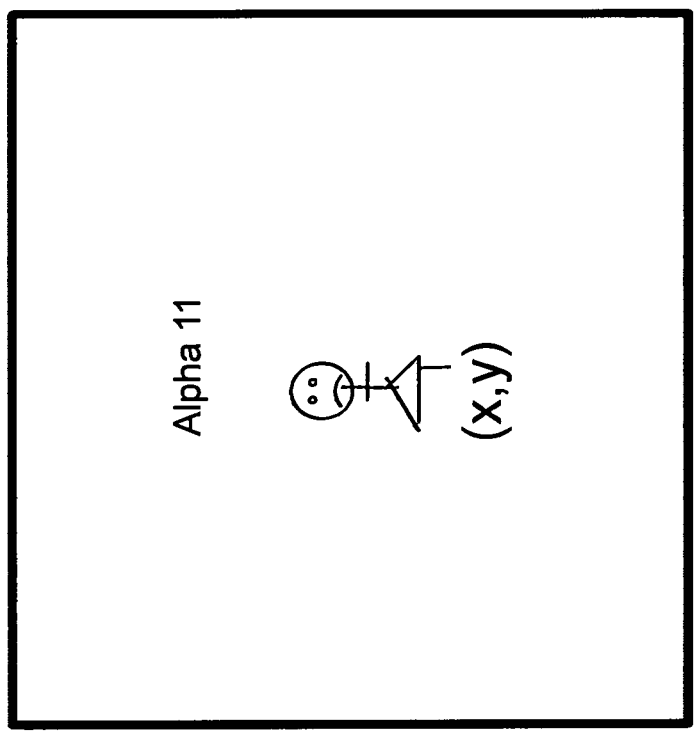
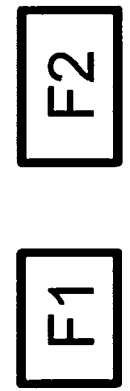
Figure 2

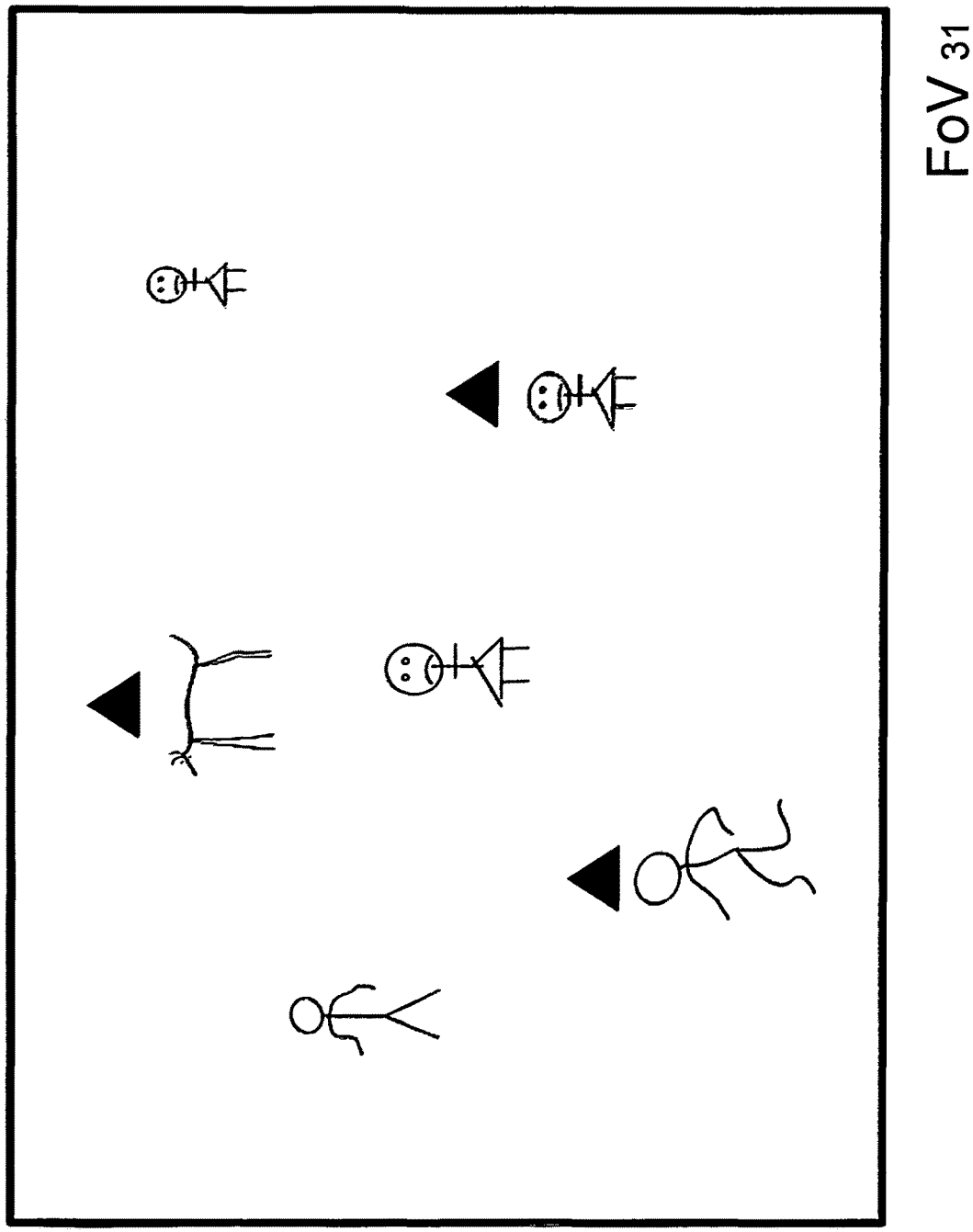
Figure 3 Avatars that can be rented or bought

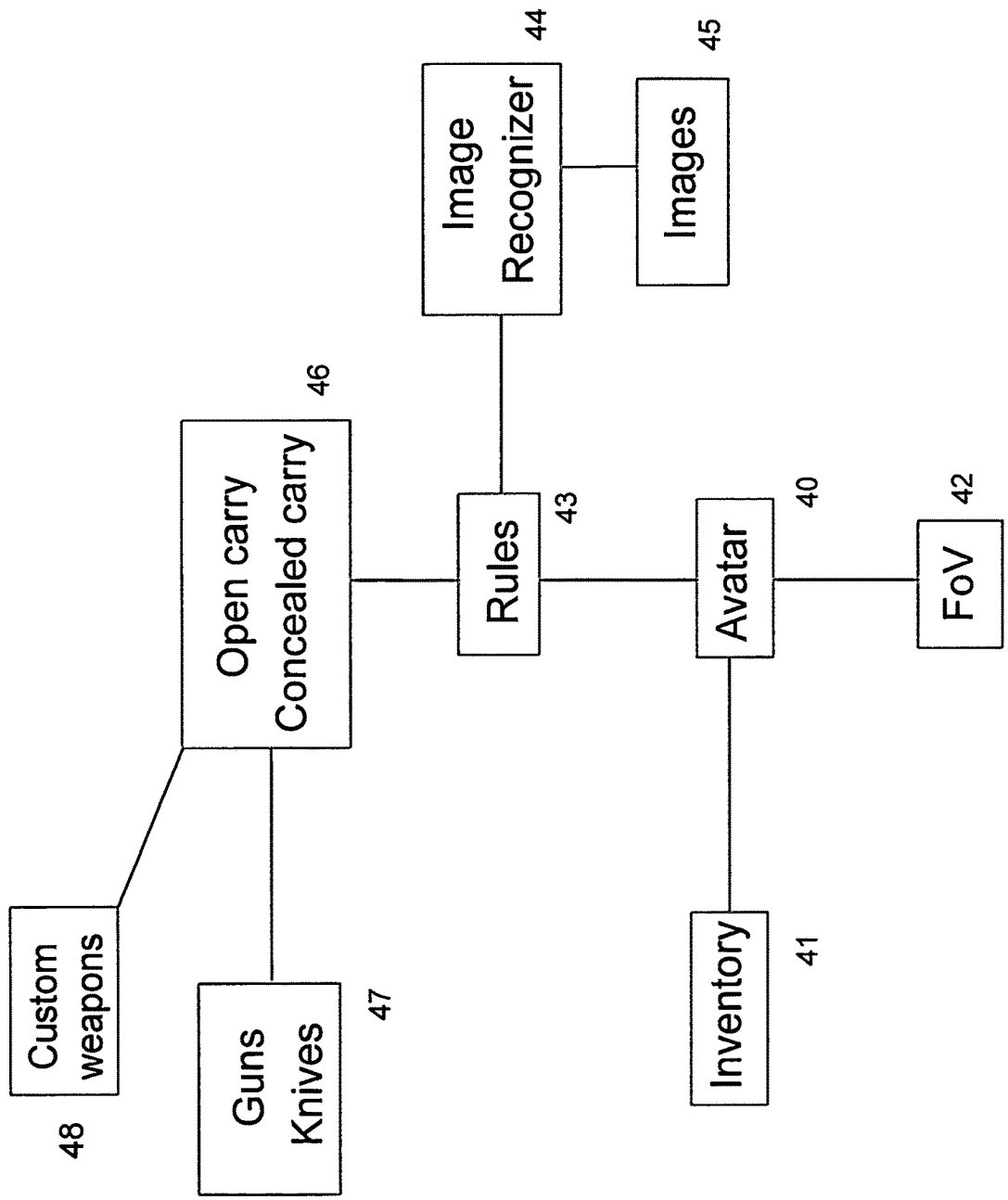
Figure 4 Forbidden and allowed items

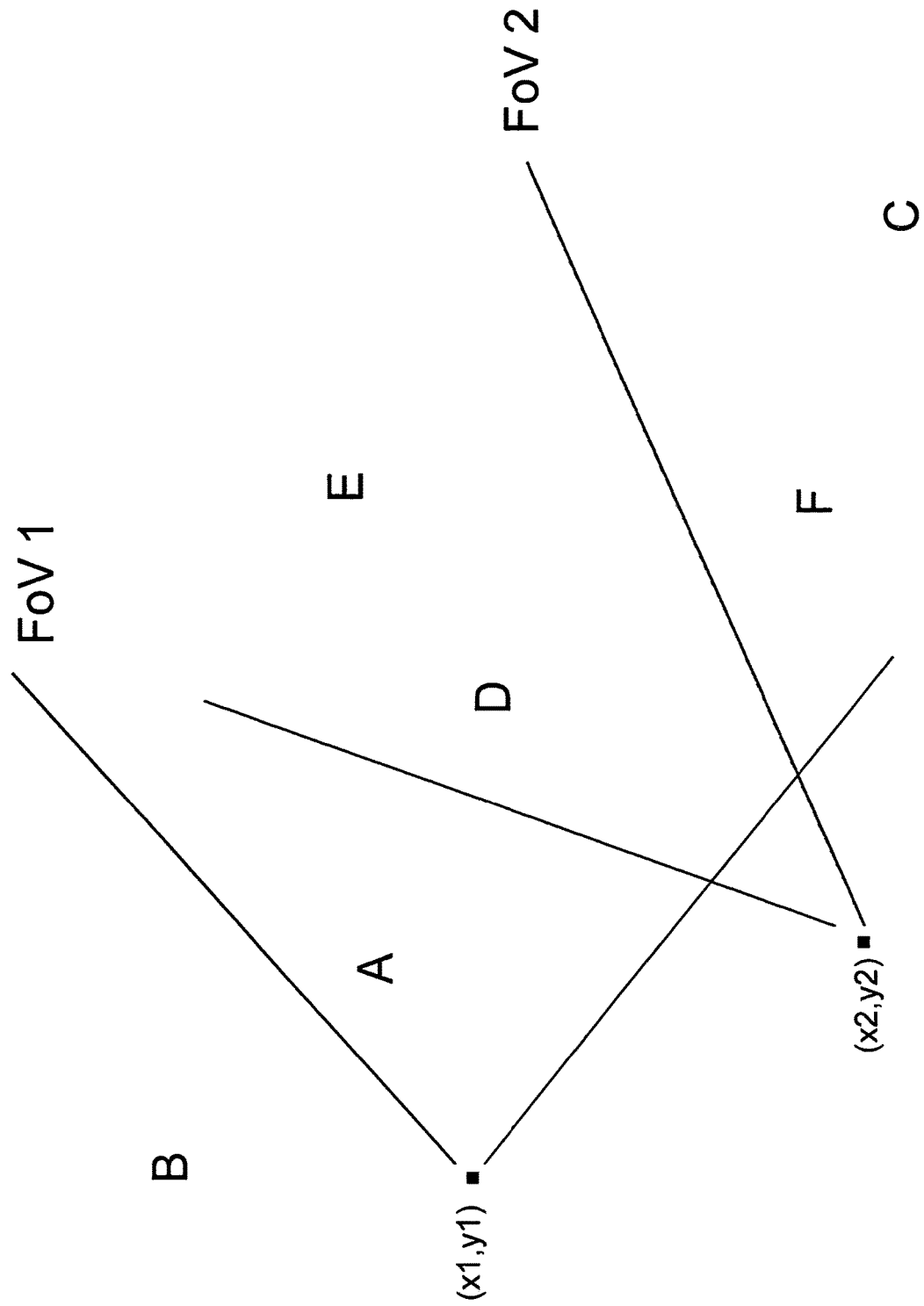
Figure 4a  Finding locations of avatars

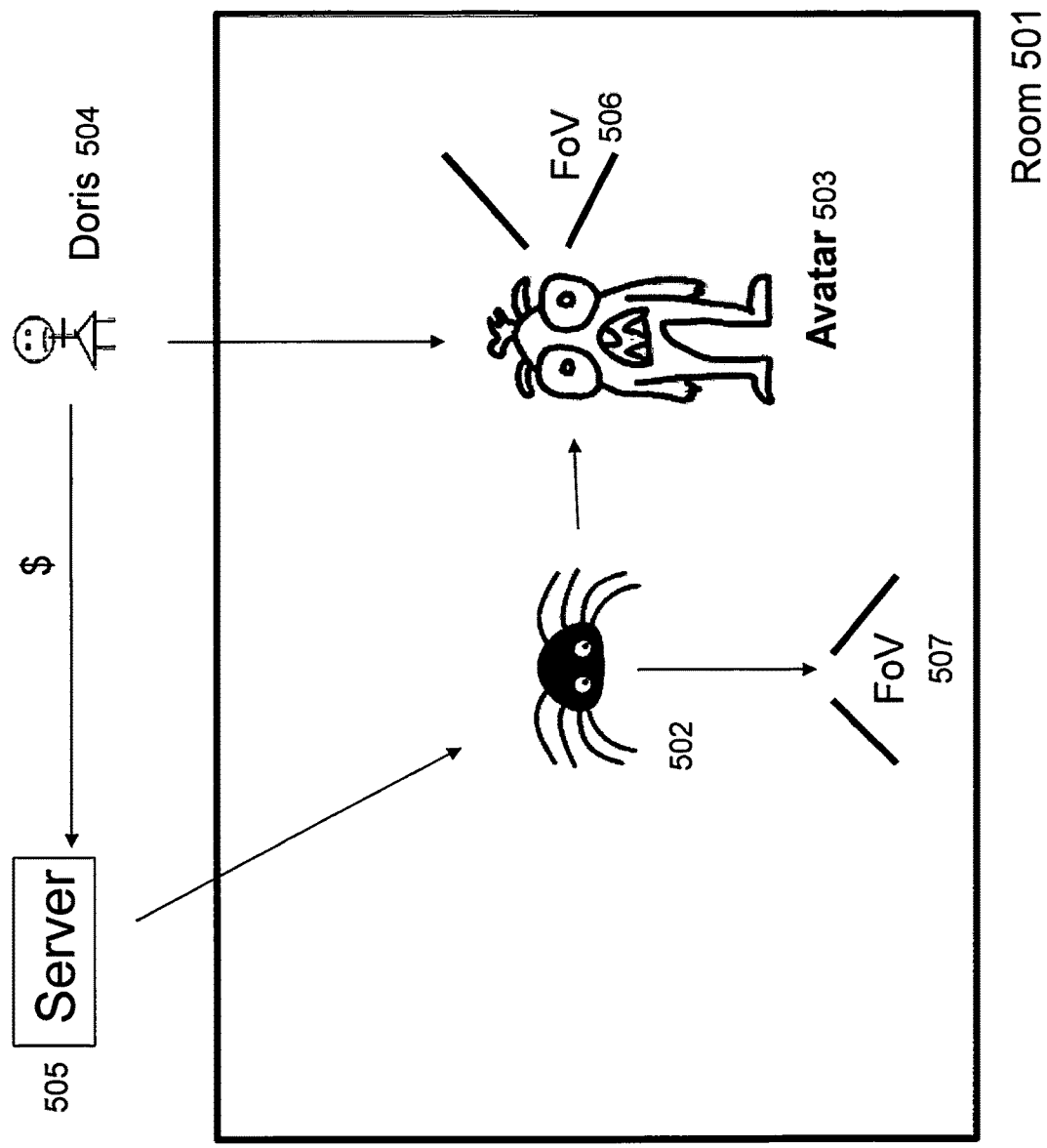
Figure 5 Spider follows an avatar

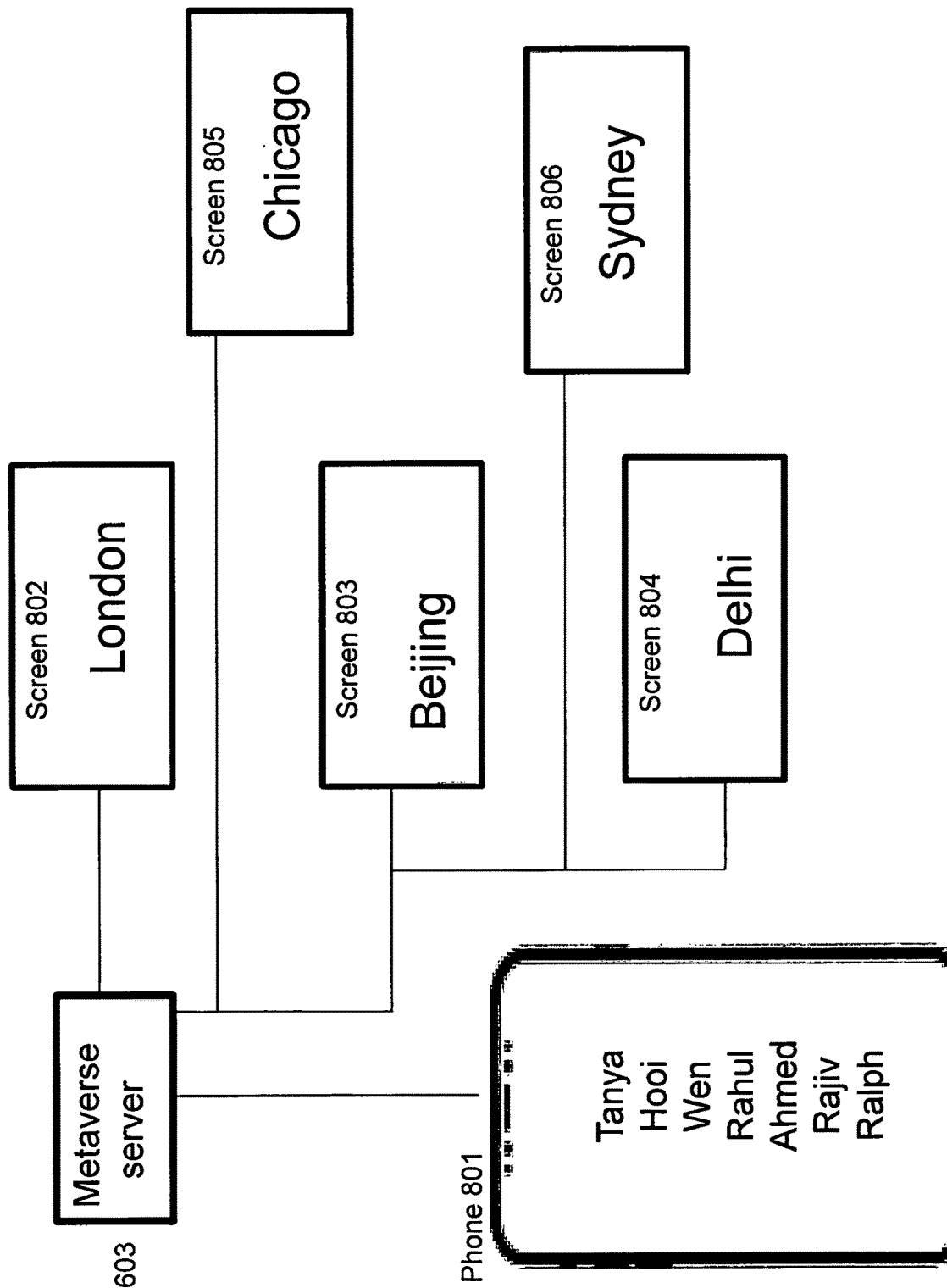
Figure 8 Controlling users globally

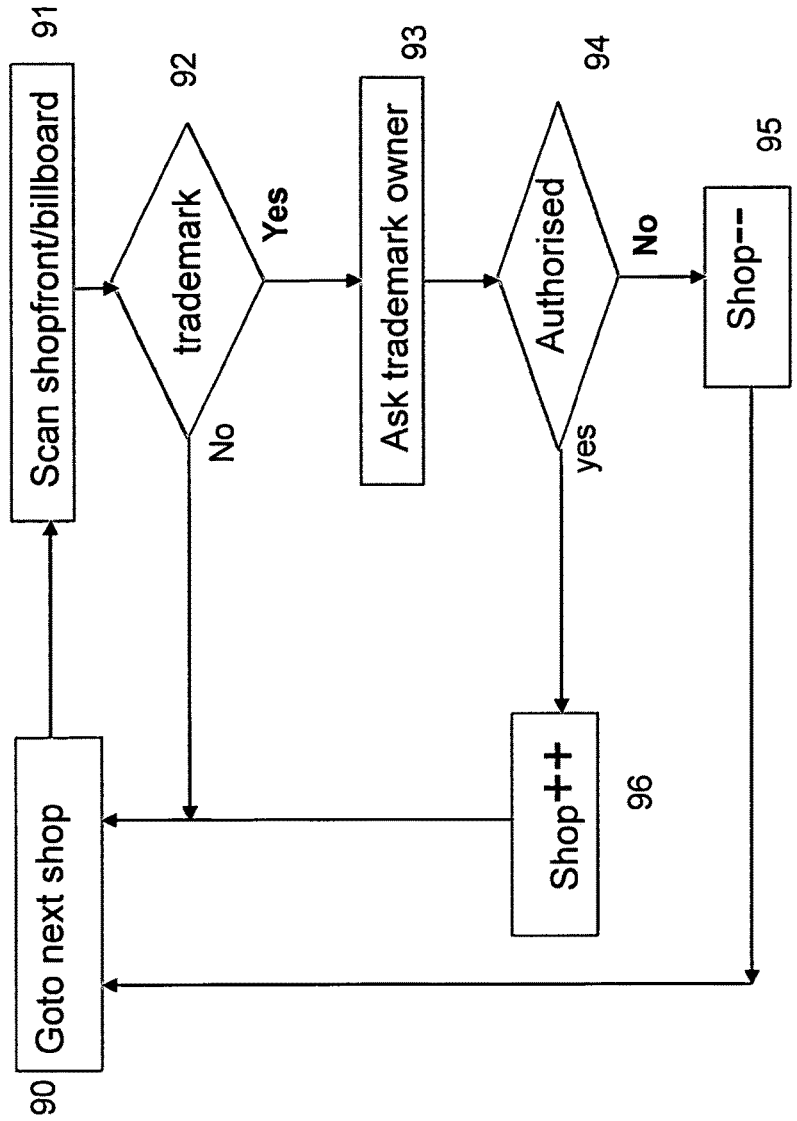
Figure 9 Look for fake trademarks

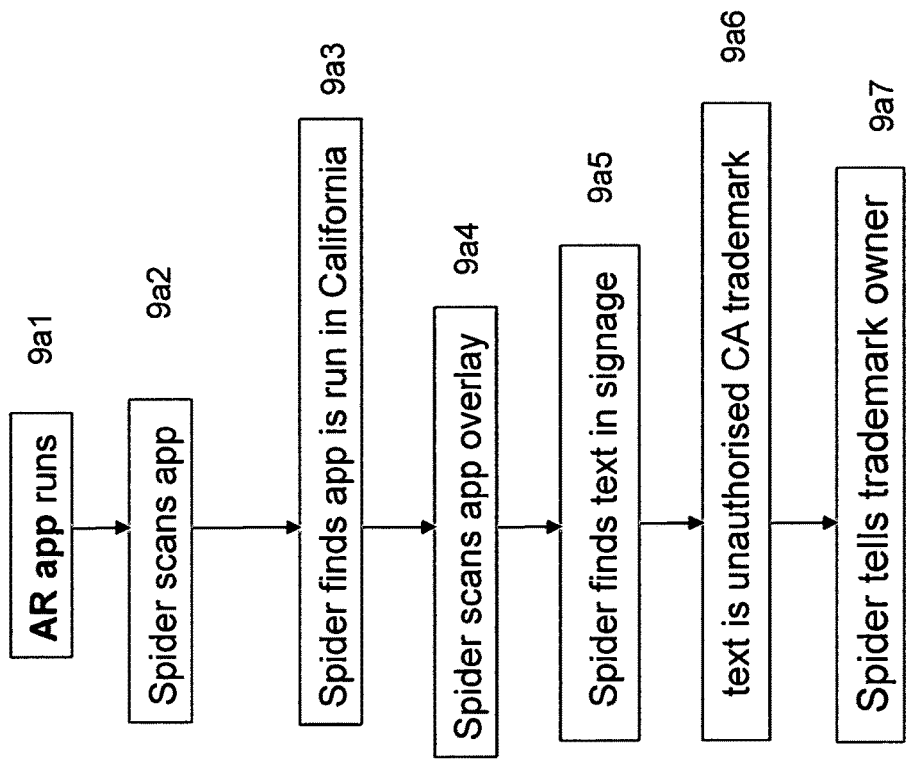
Figure 9A Look for fake trademarks in California

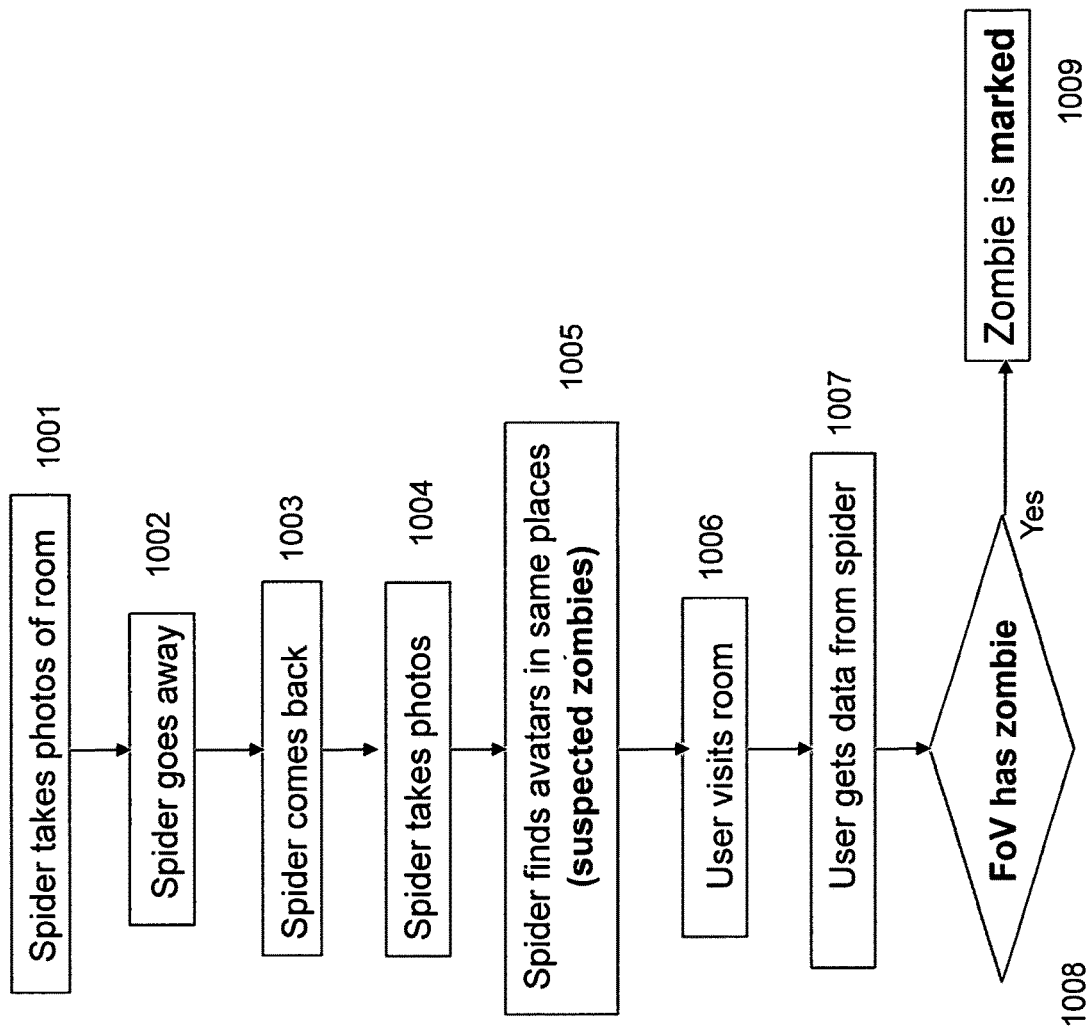
Figure 10 Look for zombie avatars

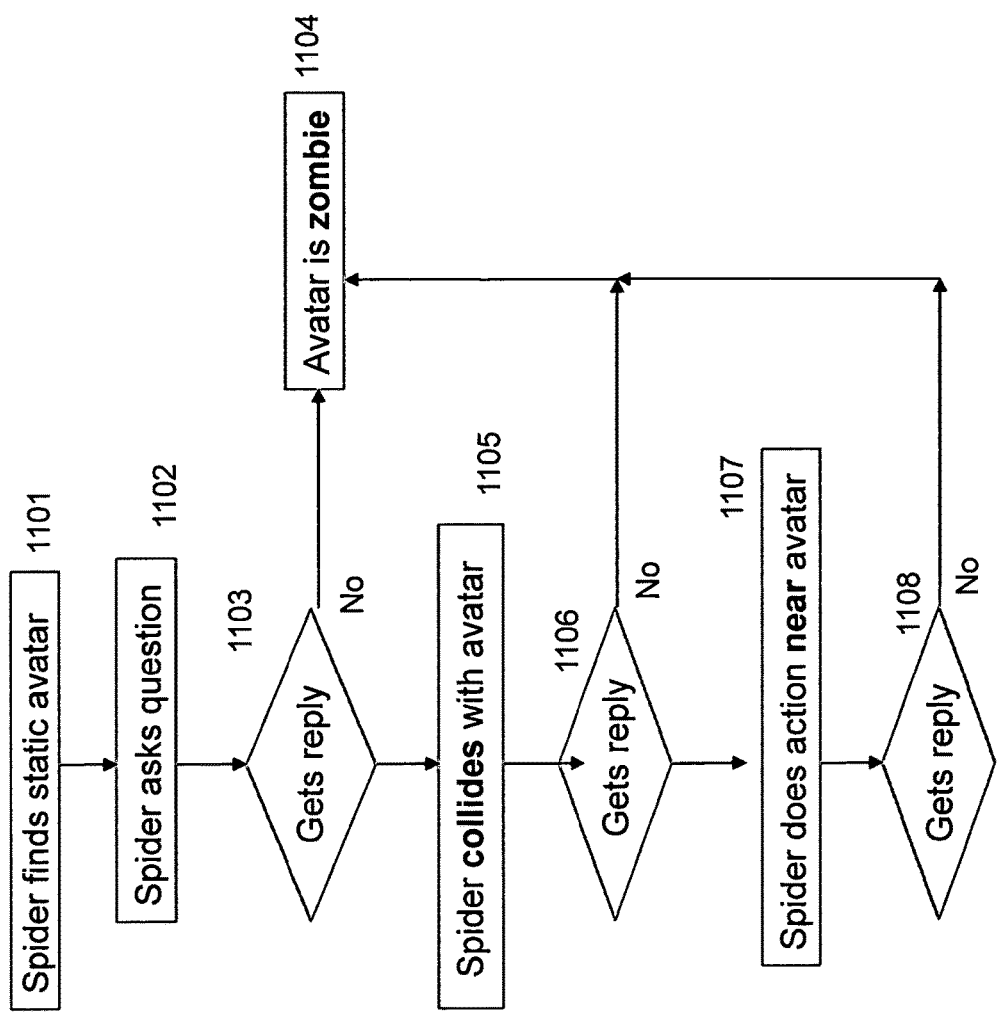
Figure 11 More tests for zombie avatars

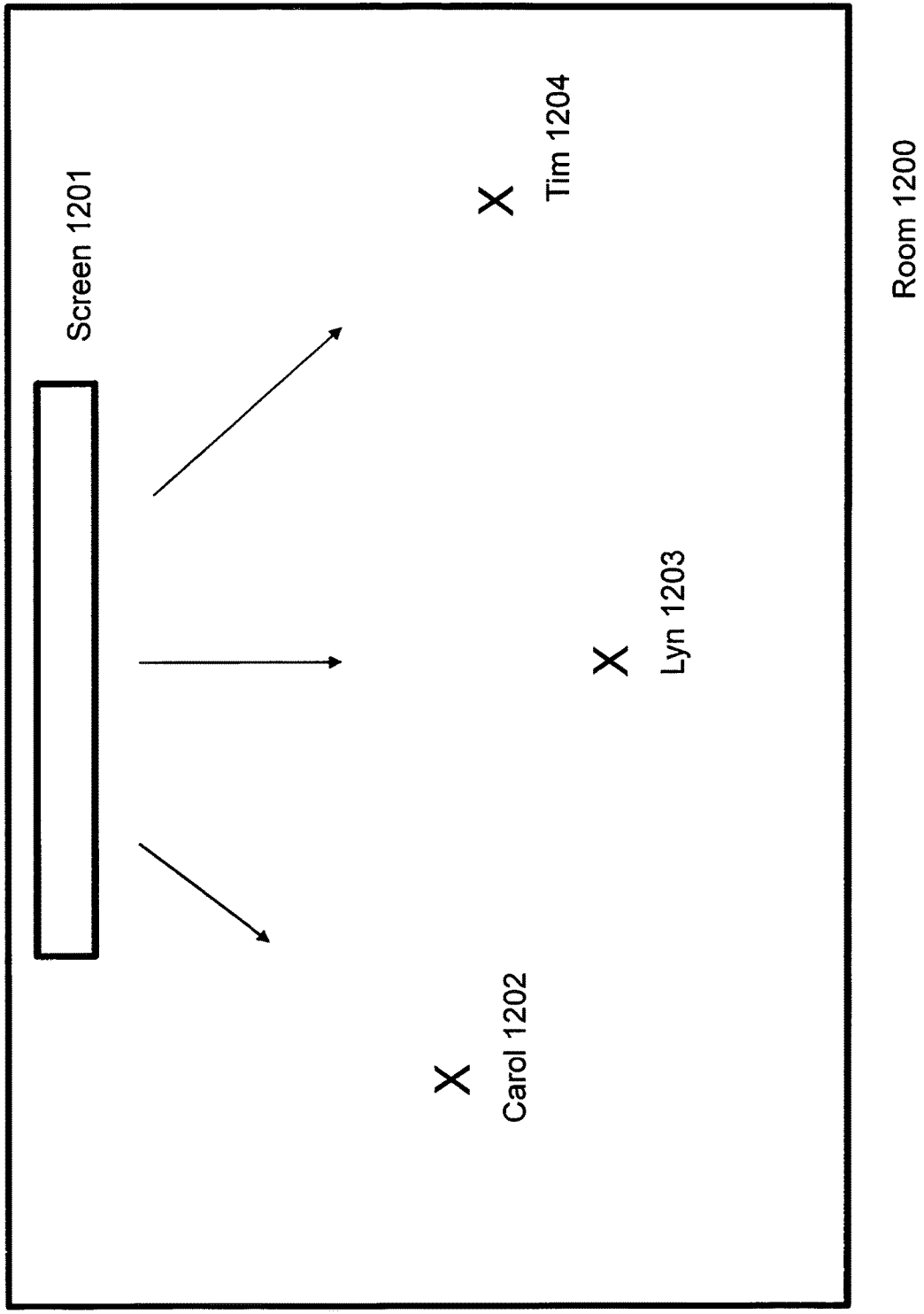
Figure 12 3 users watching video in VR room

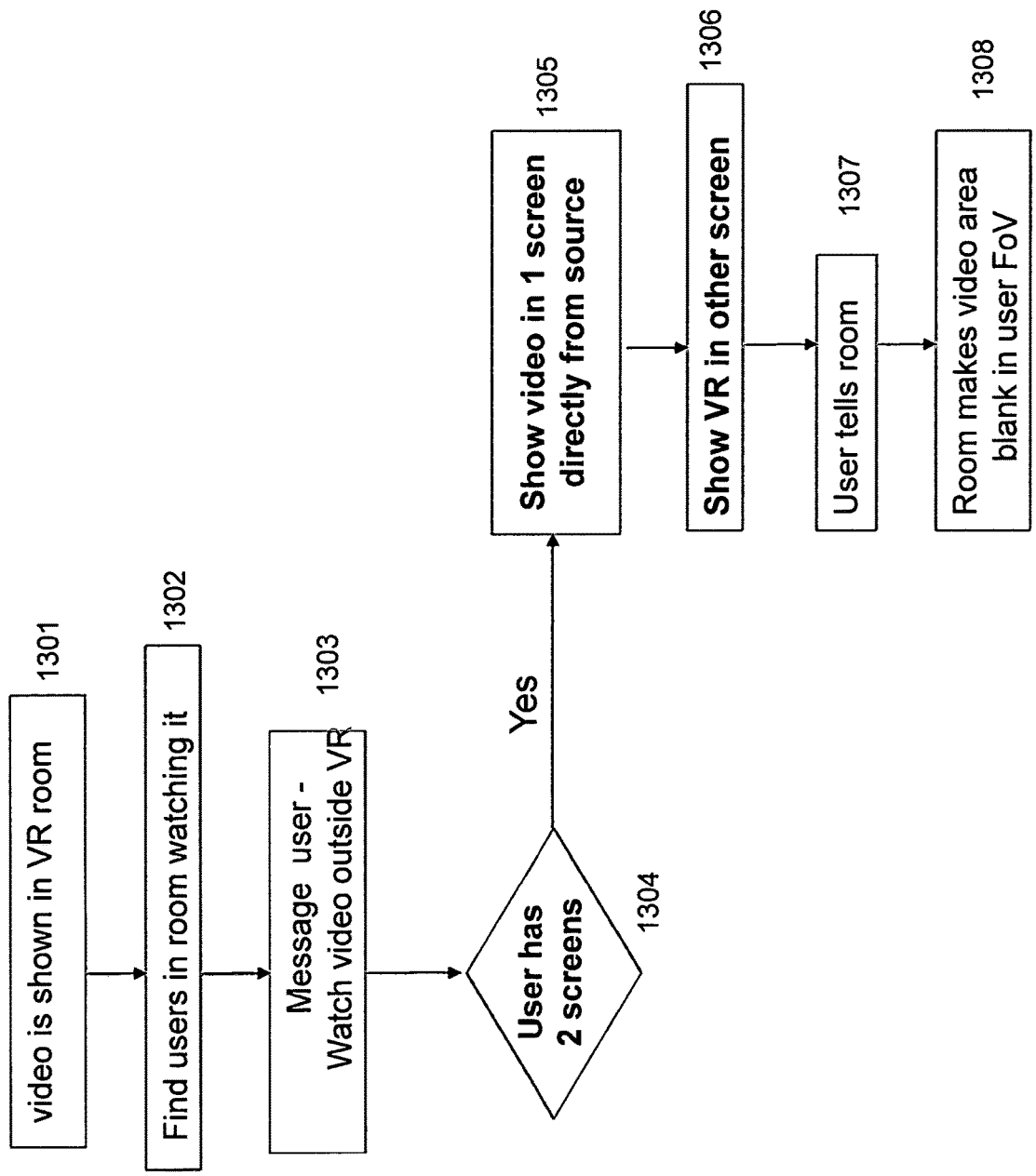
Figure 13 Reducing cost of video in VR room

GHOST SPIDERS AND ZOMBIE AVATARS IN THE METAVERSE

TECHNICAL FIELD

Augmented reality, virtual reality and Metaverse

BACKGROUND

Augmented reality (AR) and virtual reality (VR) have grown substantially. This led to predictions of a "Metaverse", notably by FACEBOOK CORP, which has rebranded as "META". The Metaverse is a simulated 3d environment in which a so-called "Web 3.0" might happen.

There is much activity on making new hardware Heads Up Displays (HUDs) in which to view and take part in the Metaverse. For example, FACEBOOK bought Oculus and is making new Oculus HUDs. GOOGLE is emphasising AR HUD development, inspired by the success of Pokemon Go, a game made by NIANTIC. The latter is a joint venture between GOOGLE and NINTENDO.

It may be safe to suggest that the future direction of the Metaverse is very uncertain.

BRIEF DESCRIPTION OF THE DRAWINGS

FIG. 1 shows the FoV of Bill when he is in a room looking at avatar Alpha.

FIG. 1A shows decisions when buying an avatar.

FIG. 2 shows Bill's FoV showing Alpha, and 2 control buttons in his HUD.

FIG. 3 shows Bill seeing avatars, 3 of which can be rented or bought.

FIG. 4 shows how a room can have policies on forbidden items for an avatar.

FIG. 4A shows how a spider estimates locations of avatars.

FIG. 5 shows a spider following an avatar in a VR room.

FIG. 8 shows a phone controlling other users accessing the VR/Metaverse.

FIG. 9 is a flow chart detecting trademark infringements.

FIG. 9A detects trademark infringements in an AR app run in California.

FIG. 10 is a flow chart of detecting zombie avatars.

FIG. 11 is more tests to detect zombie avatars.

FIG. 12 shows 3 users watching video in a VR room.

FIG. 13 reduces the cost of watching video in the VR room.

REFERENCES

Figure 6:
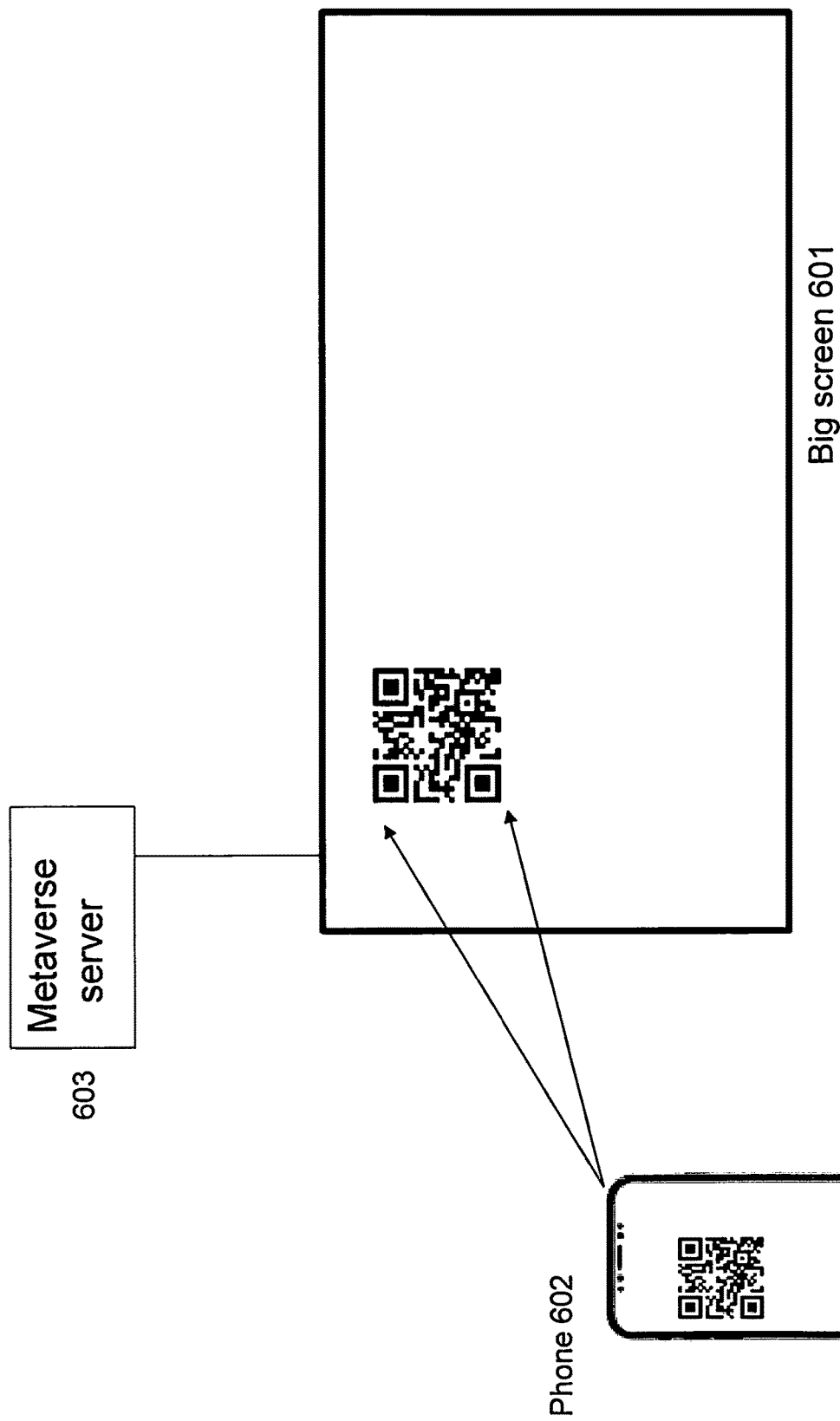
FIG. 6 shows a phone scanning a barcode on a nearby large screen.

"Contextual templates for modifying objects in a virtual universe" by Finn et al. #20100177117, 14 Jan. 2009.
https://9to5mac.com/2022/01/04/report-apples-upcoming-ar-vr-headset-will-feature-innovative-three-display-configuration/

DETAILED DESCRIPTION OF THE PREFERRED EMBODIMENT

What we claim as new and desire to secure by letters patent is set forth in the following. This application has the following sections:

1: Basics;
2: Multiple avatars;
3: Customizing an avatar;
4: Ghost spiders;
5: Spider following an avatar;
6: Promoting the Metaverse to users;
7: AR/VR and Metaverse and websites;
8: Detecting trademark violations;
8.1: Trademarks at a US state level;
9: Zombie Avatars;
10: Optimising a VR room showing video;

1: Basics;

The Metaverse is accessed via the use of avatars by humans. An avatar is a "skin" of (usually) an idealized human. An owner puts her avatar in a 3d simulated room, and moves the avatar. It interacts with other nearby avatars, worn by other humans. The Metaverse has many rooms. Each is a separate 3d simulated environment. A room might be an entire building. Or it might be outdoors. Some proposed suggestions of a Metaverse call this a world, and the Metaverse is a union of many worlds.

The level of simulation inside a room can vary. Some use realistic physics (like the gravitational acceleration being 9.8 meters/second**2). This arises because the designer of that room might want to simulate a game played in real life. So it is important for objects to interact according to the physical expectations of users trained in the real world.

A fundamental operation is the buying or renting of an avatar. We expect that specialists will arise to design avatars, just as there are those who design websites for others. In this specification, we use "designer" to mean a designer of an avatar.

Note that an avatar can be more than just one 2d graphical layer skin. An avatar can have clothes, where a particular outerwear can be taken off or put on. Each can be considered a skin. Or the entire set of such wearables might collectively be a skin.

More generally, the avatar can be articulated in varied ways. The avatar does not have to be human-looking. It might be a lion or werewolf or griffin. The creature might be based on actual animals or fully imaginary. How a model lion moves is very different from how a human moves. The articulation might be something under the control of the designer. One consequence is that copying an avatar can be more complex than copying a 2d surface.

The copying can be the copying of a full computer program.

Let Jill be a designer of avatar Alpha. She shows it in a room to Bill. He might be currently using an avatar, or not. This is an immediate difference between a room in the Metaverse and reality. The room could have users present only as a 'ghost'. They can see an image of the room. Perhaps they can see video of avatars and objects in the room. They might be able to change their (x,y) location. Or they might be seeing the view from an (x,y) under the control of a "guide". Ghosts allow a room to have an unlimited number of users. But having each ghost be able to move independently with her (x,y) under her own control can be taxing on the simulation. A simplifying point is to have "tour groups". Each group has a tour guide who controls the group location. The group might have only one Point of View (PoV), controlled by the guide. Or it might permit a few PoVs, to let users have different views.

Computationally the problem is not so much each user having her own (x,y), but the effort to draw the FoV at that location. If there are thousands of users, the effort can be challenging, especially if avatars and objects (Non Player Characters (NPCs)) are moving.

Some rooms might have a policy to only admit users wearing avatars, or to only admit ghosts, or to admit avatars and ghosts. The room might be specialized to show avatars that can be rented or bought. Like a real world showroom of latest fashions, with perhaps a runway for models to strut. The models in our case are the avatars for rent or sale.

Jill wants Bill to "test drive" Alpha. He can take temporary control of Alpha. If Bill is already in an avatar, he needs a graphical widget in his FoV that his avatar can click/press/toggle/kick/etc. The widget might be shown perhaps floating near him. Or shown on a depiction of a control panel or wall. He picks the widget. This causes his avatar to be frozen in place. His (first person) FoV is now from Alpha. He is seeing the view thru Alpha's eyes. And by using the physical controls on his HUD rig, he can control and move Alpha. Jill, as a designer has hooked up the hardware controls on the HUD to let Bill fully articulate Alpha.

If Bill is present as a ghost, then being able to (eg) click the virtual button widget is not possible. Instead, Bill has to use his HUD rig and the physical controls therein to do the equivalent of pressing a button to transfer himself into Alpha.

FIG. 1 shows Bill's FoV when he has an avatar (which is not shown) and he is in Jill's room. He sees Alpha 11 in his FoV. Also in his FoV is Button 12. If his avatar clicks it, his FoV shifts to him wearing Alpha. Button 12 might be "free floating" (unattached) in the room. Or button 12 might be attached in some manner directly to Alpha.

(A variant is there could be more details in FIG. 1. There might be a second button that lets him do a "buy it now" where instead of Bill trying out the avatar, a buy process is done, where Bill pays with real world money or ficticious money (used only in the AR/VR system) and takes possession of Alpha.)

When Bill now controls Alpha, he can move it in the room to try it out. During this, he might still be able to control his original avatar, to move it. Or the avatar might become still while he tries out Alpha.

A variant is where when he controls Alpha, it is moved to another virtual room. This is a fundamental difference between VR and the real world. In the latter, he and Alpha have to stay in the room. In VR, as Alpha is moved to another room, he follows automatically, Consider now where Bill has either done a "buy it now" on Alpha, or he has just tried out Alpha and decided to buy or rent it. He now has 2 avatars. In practice, he wants to have active control of only 1 avatar, and put the other into temporary storage. In general, if he owns several avatars, this is just a list held by the AR/VR system, and associated with him. We can imagine the list having an indicator of the current avatar under direct control.

FIG. 1A shows what might happen when a user looks at avatar Alpha. This figure is what might appear on Bill's FoV, put there by the rig's operating system or by the room's software. Item 1a2 is a set of 2 radio buttons. For him to decide whether to buy or rent. A choice of buy is shown. To be sure, for which ever choice, there might be more detailed sub-options for him to do, like a payment process. Item 1a3 is a second set of radio buttons. The first choice, control, means that after Bill is done with panel 1A1, he will be running actively Alpha. "Control" refers to the avatar Alpha that he is buying or renting. This can also cause Bill to turn off his first avatar, rather than leave it in some type of autonomous mode when he was testing out Alpha.

The option "Store" means the current avatar, Alpha, will be moved to a list of his avatars. If he chooses this, then he might revert to active control of his most recent, other avatar. His rig in conjunction with the VR system, keeps a record of his history of controlling avatars. An analogy is a Web browser, with the back button and a history of recent webpages the user has visited.

The case of the user picking "Store" also leads to sub-cases. He can leave Alpha in its current room. But perhaps more likely Bill removes Alpha from the room. He can keep Alpha on his list of avatars without having to put Alpha in a specific room. Or he might have a room (likely under his control) in which he puts his avatars.

If Bill had bought Alpha and was not controlling another avatar (he was in ghost mode) then some of the above discussion is moot.

FIG. 2 shows what Bill might see if he does not have an avatar. FoV 21 is what he sees using his HUD. In his FoV he sees Jill's avatar Alpha 11. Items 21 and 22 are controls in his HUD. These might be buttons he can click (eg to fire a weapon in a war game). The buttons have labels F1 and F2. In practice, these labels would be changed by the Metaverse room that he is in. One of these buttons, eg F1, can have the effect that if he clicks it, his FoV changes to him being in Alpha 11 and he can now move and control in other ways that avatar.

For example, the label F1 might be changed to say "first person" or "test drive" to be meaningful to Bill and to help induce him to click.

FIG. 2 might be familiar if the reader has played games using a game console. The latter comes with various hardware buttons that the player clicks during a game. Or even if Bill has played a game on a PC or laptop or mobile device. Game designers for those hardware have ways to assign some buttons or keys on the keyboard to do common actions in games. Given these 4 hardware cases, we expect that hardware designers of HUD rigs will enable similar functionality of the F1 and F2 keys of FIG. 2, and of the software functionality of the widget in FIG. 1.

If Bill starts off in an avatar, then when he shifts to being in Alpha, his first avatar might be put in some remote control or autonomous mode. This can cause the first avatar to move in some direction, and then reverse direction etc. Walking in circles perhaps. If other avatars are present, simple anti collision methods can be used to detect this and have his first avatar sidestep or do other steps.

Another case is where his first avatar might be standing in place, but doing motions with its arms if these do not collide with others.

Suppose Jill just shows Alpha, which might be walking around, and Bill does not need to take control of it. Then the buttons in FIGS. 1 and 2 are not needed. This case simplifies to the equivalent of Jill showing a video of Alpha. Bill is doing the equivalent of watching the video in a conventional web browser or mobile app.

When Bill tries out Alpha, his rig might also show a third person view of him in Alpha, perhaps taken from his first avatar, if it exists.

The room might have a mirror, so Bill can see himself in Alpha as a third person view.

2: Multiple Avatars;

The previous section described 1 avatar being made by a designer and offered to a user to try out. But it is possible that Bill can see several avatars in his FoV. His HUD rig needs a way to show which avatars allow this. Other avatars might have been brought into the room by other users. In general, an avatar will not be for rent or sale, even if it was originally bought by the current user/owner.

The room can strobe or otherwise change the display of the avatars available for rent or sale. Or contextual templates might be used to alter the display of the avatars. (US patent pending 20100177117.) A metaphor might be useful. Analogous to showing in a text document, text in bold or italic or with underlining or strikethrough. These pertain to text. But the idea might be extended to show some avatars being different from other nearby avatars.

FIG. 3 shows Bill seeing several avatars in his FoV 31. Three avatars have a filled in triangle above them. The triangles indicate that those avatars can be rented or bought. As the avatars move, those with the triangle above them have the triangles move in tandem.

Suppose there are several users like Bill in the room, running avatars or as ghosts. They might all see the same avatars who are available for rent or sale being shown visually different. In this example, the 3 avatars with triangles above them are all seen by users.

In FIG. 3, suppose Bill wants to try out one of the 3 designated avatars with triangles. He can use his HUD to pick one of those triangles, or to pick the avatar it is referring to. The room display software would make this possible. It makes each of the 3 avatars with triangles be sensitive when Bill moves his cursor (or do any equivalent graphical action in his rig) on the avatar or its triangle sign. This lets Bill pick the avatar.

Suppose Bill rents avatar Alpha from Jill and is actively controlling it. She can put a remote control timeout feature in Alpha. At the end of some rental period if he is still using it, control reverts to Jill, and Bill's control is sent back to his original avatar (if he had one) or just back to his HUD if he entered the room as a ghost.

Before the timeout has expired, Jill might have the means to manually reassert control of Alpha and force Bill to exit Alpha. A variant is where when Bill entered Alpha, there is a soft communications button he can access. He can use this to ask Jill for advice or suggestions. In general, when she was designing Alpha, the design framework she was using would let her place that signal button inside Alpha. Possibly this might be done by default. She would have to manually decide to remove it.

Above we described a room showing in some way the avatars which can be rented or bought. All those watching would see the same indicia. Like a virtual green sign above these avatars. This can be extended. The signs can be different based on the cost of renting or buying. Suppose the buy prices range from $10 to $500. For avatars in the range $10-$100, the sign above the avatar might be green, for costs $100<$500, the sign might be red. We cannot show these colors in the figures, due to restrictions by the US PTO. But the reader can readily imagine such attributes.

Or the signs can be personalized for each person (avatar or ghost). If Bill is looking for an avatar with leather jackets, then only the signs above those avatars are shown. Other avatars nearby for rent or sale do not have any signs above them, in his FoV.

Another way to visually distinguish between avatars for sale is to show avatars made by designer Jill to be "headlined" by (eg) green triangles. While avatars made by designer Todd to have yellow circles. Etc.

Bill might be able to set other display criteria. Like having the room only show avatars within 100 m of him, that are for sale.

The room might be able to let Bill only see the avatars fitting his criteria. While another visitor to the room, with different criteria sees a different set of highlighted avatars.
3: Customizing an Avatar;

Suppose Bill buys Alpha from Jill. Unlike the real world, she might use the Metaverse to put restrictions on what changes he can make to Alpha. Alpha is not just a simple bitmap. It is or it can be a computer program in its own right. An analogy is what happened on the Web. In the early Web of the 1990s, webpages were HTML documents. The contents of a webpage described a simple, statically arranged layout. In the 2000s, webpages grew in complexity with javascript and other scripting languages used. Now (2022) a webpage may be regarded as a special type of computer program. In turn, we suggest that a buildout of AR/VR sites might lead to avatars following a similar path.

For example, Jill might prevent Bill from having Alpha do an open carry of a bladed weapon longer than 15 cm. Such a (virtual) weapon would be visible to Alpha's eyes and Alpha can detect that it is holding such a weapon. So Alpha might drop it if it is already carrying it in its hand. Or Alpha might decline to pick it up in the first place, if it detects it as a weapon and estimates its length. Jill encodes this into the control logic of Alpha. This can involve Alpha accessing an external image recognition program (here, to recognise a long knife). This external program might have a database external to Alpha, with various allowed or forbidden items/images.

To expand on what 'external' means: The avatar Alpha might be implemented as a core binary plus bitmaps. The core could access other modules or subroutines or procedures stored outside Alpha. This anticipates that several avatars might need to use common functionality. The latter can be coded once and held outside most or all avatars.

Another example is Jill prevents Alpha from open carry of a firearm. She might have personal strong opinions on gun control, and wants to carry over these to the Multiverse.

Or Jill might permit Alpha to open carry, but not open carry of a sawn off shotgun. The image recognition program is assumed to have example images of such a shotgun.

This can be generalised. Some rooms (which might be entire "worlds" in the Metaverse) can have policies on what types of weapons can be carried openly or concealed. When an avatar enters the room, the room can have the means to scan the inventory API of any weapons carried by the avatar, and apply any restrictions. A first level application is for weapons carried openly by the avatar. The room applies image recognition to find such weapons. It can be expected that the room might have avatars run by itself, or operated by humans working for the room's firm. The avatars scan their FoV for newcomers to the room. Plus the room can have "cameras" discreetly located that do likewise.

For weapons carried concealed, an API (application programming interface) can be devised, such that the room can apply it to the avatar. And the avatar is assumed to "answer" the API's queries accurately about the weapons in its inventory.

This spec does not discuss what if an avatar's API does not answer truthfully the room's query about a given weapon; whether the avatar has it or not.

FIG. 4 shows the various elements involved. Item 40 is an avatar. It has Inventory 41, which holds a list of items it is carrying. If an item is an instance of a standard item, then the inventory can have an id of the latter. If the item is a custom made item not in a standard set of items, the item will need a place in memory of images of the item and any other associated data.

Item 42 is the FoV seen by the avatar. This might be plural if (eg) the avatar is a centaur with non-overlapping fields of its eyes. When the rules are run in the avatar, they can access image recognizer 44, which uses images input from FoV 42. Item images 42 is a standard set of canonical images. The images extracted from the FoV can be compared against item 42 to find a match.

Item 43 is a set of rules. These might be imposed by the room the avatar is in. Some rules might be in the avatar itself. These latter came with the avatar when it was bought, perhaps. Rules 43 can be accessed by the avatar from an API call to the room.

Item 46 is an example of rules for open carry or concealed carry. These are applied to item 47, which in a simple example has just 2 types of weapons—guns and knives. Item 48 can refer to self designed weapons. These might be done in (eg) commercially available design packages like AUTO-CAD or PROE or IDEAS. The output of such programs is in standard file formats.

From an implementation standpoint, item 44 is primarily rules done as perhaps a neural network. Item 45 might simply be done as a set of graphics. Because items 44 and 45 can be expected to be done for different types of avatars, the code and data in these might be implemented outside the avatar memory. They could be accessed by the avatar via an API. The code and data might also be outside the room memory. The network address of the code and data would differ from that of the room.

Likewise for items 46 and 47.

The core of the avatar is items 41 and 42, where item 40 stands for a central control logic of that avatar.

FIG. 4 only looks at weapons. But it can be extended to testing for, for example, clothes that might be considered too revealing. This assumes that the room is not intended as a sex site. Though some rooms might indeed be. The overall Metaverse might have few universal strict regulations. We expect that rules will largely be devolved to each room.

If the room detects a forbidden weapon, it can require that the avatar "hand over" the item to the room. This can be done by the avatar removing the item from its inventory. Operationally, the room calls an API on the avatar and sends it commands for this effect.

If the item is visible (eg. open carry) then the avatar image would be redrawn to remove that item. And the item is added to the room's stash of sequestered weapons, with each weapon having an associated id of the avatar it came from. When the avatar leaves the room, this triggers an exit routine that finds the forbidden item and adds it back to the avatar's inventory.

When an avatar tries to go to a room, the room might expect that the avatar will answer certain questions (ie the avatar has an API to this effect).

Bill could place restrictions on other copies of Alpha that Jill sells, to help give him uniqueness with his Alpha. This gets around a common problem with some women in real life buying expensive dresses. Such a woman might be embarrassed if she meets another woman wearing the same dress. (Men rarely have this issue.)

For example, Bill buys Alpha from Jill, where Alpha has a green jacket. He might pay Jill extra money to prevent her from selling copies of Alpha with a green jacket. Or he might pay her more money to not sell copies of Alpha with the same style of jacket in any colour.

Jill might restrict Alpha to be only used in certain rooms of the Multiverse. Or not to be used in certain rooms.

Another example is where Alpha wears a shirt. The designer of Alpha, Jill, also designs the shirt. She might restrict Bill from altering the shirt to say or not say certain slogans. In real life, once a person buys a shirt made by a fashion house, the house has no control over such matters.

Jill might restrict the shirt from being worn at certain events, where these events can be defined by her at a later time after Bill buys Alpha from her. An example in real life is the observed use of Hawaiian shirts at Proud Boys extremist rallies in the US in 2020-21. The designers of those shirts could not prevent their brands from being associated. Whereas in a VR room the methods of this specification might be used. Traditional copyright restrictions mostly pertain to unlawful copying of a brand and not the physical use of a garment showing the brand name.

Jill might also put restrictions on Alpha carrying virtual objects made by others. For example, to prevent Alpha carrying a tiki torch while wearing a Hawaiian shirt. Here the third party objects might not necessarily be perceived as weapons. But the avatar carrying them might add to the combined association with an undesired event. In real life, this alludes to a 2017 nazi rally in Charlottesville Va., where tiki torches were used.

It can be asked, in the latter case, the location was known. Would it not have been simpler to have a ban on a VR location, rather than on clothing worn by avatars? Perhaps. But the ban on clothing is more precise and targeted. If the avatar does not violate it, it can go to a given VR room or area within the room.

Thus far, we discussed where the designer of an avatar imposes restrictions on the use of the avatar. This can be extended. Suppose there is a party in a VR room and many users in avatars attend. The room might restrict attendance to avatars who let the room put conditions on the avatars. The room might want to (if it can) override any designer restrictions with its own. For the duration of an event. Or where the event is being held at a specific VR location.

For example, imagine a political rally in a VR room. Organisers might want only people wearing shirts supporting their candidates.

A related issue is where a room might want to override the skins of some or all avatars in the room to show some chosen slogans and images. Here, when an avatar attends, it might not be wearing any of those slogans or images.

A variant is when a user in an avatar goes to a VR room, she wants to rent out the avatar's surface to organisers of an event. They can use her avatar as a mobile billboard for their purposes if they compensate her.

A variant on the previous paragraph is when the avatar goes to the room, another avatar Phi in the room wants to use the first avatar's surface to show images and slogans. Phi might be the organiser of an event in the room, Phi might be independent of the owner of the room.

A major variant is where the designer sells the avatar but restricts what types of physical activities the avatar will do. Jill might prohibit in Alpha's code the ability for Alpha to do jumping jacks or pushups or high jumps or bicycle riding or sit ups. And Jill might prohibit Alpha from wearing a paramedic's uniform or a police uniform. These uniforms are well defined in real life and can be easily detected by image recognisers.

The Multiverse lets the customizing of an avatar to be far more intricate than buying a suit in real life.

Suppose Bill picks Alpha to try out. This picking can move him to a different room in the Multiverse. It might effectively be a large change room with a mirror. (Bill automatically appears in Alpha, so he does not actually change.) The room might have an avatar of Jill or an avatar of an assistant.

Suppose Alpha is a combat avatar. The combat room (for want of a better term) might have NPC bots outfitted as (eg) swordsmen comparable to Alpha, so Bill can do a workout against them, to try out Alpha.

A variant of this is where Bill can introduce bots of his own, that he has trained against. So Bill can practice fighting against his bots.

If Bill clicked in the first room to go to the combat room, and he wants to go back, the first room might try to let him go to his last place there if he was in an avatar. But if (eg) it is now occupied, the first room puts him elsewhere.

A variant of the above is where the combat room might have human-controlled avatars, so that Bill using Alpha can have a workout against them, on a 1 to 1 basis or more. The humans might be supplied by Jill or by Bill himself.

4: Ghost Spiders;

A spider is a program used by a search engine to visit websites and analyse them to gather search data. Websites wish to rise in the search results to increase their influence in attracting visitors. We consider a room in the Metaverse to be analogous to a webpage or a set of webpages. As a room deploys and attracts visitors, it will want to be spidered by a search engine. A VR spider can be considered to be a program possibly made by a search engine, specialised to visiting and analysing VR rooms.

A room might have a "door" to another room. The latter room might or might not be owned by the same firm that owns the first room. The visual metaphor of the door is the analog of an URL from one webpage to another. A conventional web spider follows URLs from the webpage it is currently visiting. The Metaverse spider thus would (try to) go through a doorway from the current room to the other room.

A response by some is that a depiction of a physical door is outmoded thinking. Users need only to be able to see buttons (or equivalent) on their HUDs. Each button points to another room. But we suggest that the inherited physical experience of real doors will bleed over to the Metaverse. Some rooms will show doors to other rooms. Though the rooms might still have buttons on the HUDs to let users get to other rooms.

A VR door might, at the simplest level, be open or closed. If the door is closed, a visitor in the first room may have to do an action to "open" the door. What this entails is up to the second room, and possibly the first room in conjunction, to define. But if we assume that a room will in general want to be spidered, then the steps of opening the door will likely be able to be done by a spider program. This is similar to webpages and URLs. An URL can be clicked and it will load the target page. The Web has a way for an URL to have the user type in a password. The Metaverse room can have an analog.

But it is possible to have a door having far more complex requirements than a password. One example is that to open a door, 2 users need to enter at the same time.

A variant is where both users needs to be using avatars.

A variant is where 1 user is a ghost, and the other user has an avatar.

A variant is where the 2 users are ghosts.

A generalisation is where 2 or more users are needed to open the door.

Return to there being 1 user, who is a Metaverse spider program. The spider might use an avatar. But we suggest the simpler case is where the spider is a ghost; it has no avatar. By not having an avatar, the spider is unrestricted in rooms that accept visitors but take into account the (virtual) "space" taken up by the avatar. We suggest "ghost spider" as terminology to address what might be a common case in spidering of VR or Metaverse.

When the spider enters a room, it might be effectively incognito to other visitors at that time. Whether this is true or not depends on the functionality extended by the room to the visitors. Can they really list all the current visitors? The spider might want to obscure itself. Perhaps by using a pseudonym, which might change on other visits to that room, or change in visits to other independent rooms. The spider's firm may desire this, so that the act of the spider going to and watching and recording a room does not influence the actions of the visitors.

Once in a room, the spider can make a copy of what is in its FoV. It is expected that rooms will have enough computational ability to show avatars moving relatively smoothly. But whether the firm running the spider wants to record this "video" (or is able to do so) is another matter. The spider might just take snapshots and send those to its remote server.

FIG. 4A shows 2 locations of a spider. At (x1,y1) it has FoV 1. At (x2,y2) it has FoV 2. A, B, C, D, E, F are avatars. D and E are in the overlapping FoVs. The spider can estimate the locations of D and E. The more crowded a room, the more FoVs needed by the spider. For more accurate estimates, the spider might have to do more jumps closer to D and E.

Suppose the room has more information about its visitors. Like a publicly shown text name of some avatars. Maybe a username or email address or phone number. Then if users have given the room permission, such data is made accessible to the spider, to send to its server for storage and analysis.

The spider might do an initial automated estimate of the number of visitors in the room it is in. Or it might get this from the room itself, as part of the statistics the room makes to induce users to visit. Then the spider might jump to another location in the room, to perhaps take a photo at a different angle, of the visitors. Or to take a photo of avatars blocked by others when the spider was in the first location. If a room has only a few visitors, the spider might only take a few images and only do a few or no jumps.

In the analysis at the spider server, it might (try to) track avatars based on their images. And perhaps also based on their text names, if these are available to the spider. So if there are avatars of a green and yellow 2 meter dragon in 3 rooms, then the spider server might ultimately let a user of the search engine search for "green" and "yellow" and "dragon" and "height>1 m" (say), and see results in the search engine. The results might be— a) textual. A list of the rooms in which those images appeared, and the times when this happened. Perhaps it was the same avatar at different times in each room. A user can use this to estimate the interests of the human user of that avatar.

b) images. Snapshots of the dragons captured by the spider. We say "spider" for simplicity, though the search engine might well have run multiple spiders in parallel across various rooms of the Multiverse.

The spider might also have the equivalent of location data on the avatars. This refers to the locations of an avatar inside a room. (And not just the "coordinates" designating the rooms themselves.) Here it can be that locations can vary greatly between rooms. A specific room might be say 100 m×100 m (like a large ballroom). While a different "room" might be an outdoors area of 2 km×5 km. A given room might tell the spider its dimensions or not. The spider server may be able to estimate locations of avatars in each room.

The spider server can let a user submit an image of a (possible) avatar. The server finds instances of similar images in its data and returns those images or summaries or which rooms and when those images appeared.

A user might ask the spider server for avatars that caused weapons policy violations or sexual violations (or other types of violations) according to the rooms the avatars appeared in, or tried to appear in. Examples of queries are "avatars that violated concealed carry of guns" or "avatars that carried sawn off shotguns". (Of course, the user might ask for the Boolean opposites of those examples.) The server can give data about any avatars that satisfy those queries, where the data might include links to rooms where the avatars appeared in, or tried to appear in. The data could include videos or photos of the avatars, to the extent that the spider server has any of these.

The images the spider takes are mostly of avatars and NPCs. It likely has no images of ghosts.

When a spider appears in a given room is also interesting. If a room has many visitors, the spider might want to revisit the room at that time to get more data. Note that the data is typically about visitors. Suppose a room has concerts every Friday "night". Perhaps here night means night time in the real New York. And the spider finds or is told by the room that there is a big turnout every Friday night. The spider can make a point of visiting at those times, for some brief duration.

To this end, a room might post a calendar to the public. Electronically, this can be done as a conventional webpage. Or as an API. The spider can search such calendars to get clues as to when it should visit a room.

When the room has many users, the room can send a message to the spider server. The message can have a link to the room, so that the server can easily send a spider to the room.

When a user makes a buy of an avatar, or rents an avatar, the new owner of the avatar can send a message to the spider server. The message contains a link to an image of the avatar. Maybe also an image or coordinates of a room where the buy/rent was made. This might be null if the buyer/renter did so in a direct visit to the owner's webpage or mobile app. Here, the buy/rent decision might be made outside the Metaverse or associated VR space. But the spider might still find it useful to record the transaction to later users to find.

The payment amount can optionally be verified by the owner presenting a transaction receipt. This might just be a conventional electronic receipt output by a financial entity like PAYPAL CORP. Having a receipt can give greater credence to the transaction, and the spider server can let users search for financially verified events.

5: Spider Following an Avatar;

The previous section can be extended. A spider can follow an avatar. First, the avatar can contact the search engine and give it a link to the avatar's location. The avatar might also give the spider server images of the avatar. Then at some later time, when the avatar is being actively controlled by its user, the avatar jumps to a Metaverse room. Its link is updated to point to the current location in the new room. The server can decide if it wants to follow the avatar. If so, it spins up a spider and the spider jumps to that room. The spider finds the avatar. It may likely already have an image of the avatar from earlier meetings. Or the link to the avatar (given by the avatar to the spider server) lets the spider appear close to the avatar.

Another case is where the link to the avatar gives the spider a first person view through the avatar's FoV. The user of the avatar consents to this. The spider watching and likely recording what it sees is acting passively. It now does not have to search for that avatar, and it gets the video feed.

The ability of a spider to show a first person view thru an avatar's eyes is very different from current data spidered by most (or all) search engines. An avatar likely has 2 eyes. In VR, each eye gets an input which is a simulation by the room, using various computer graphics techniques, including ray tracing.

This is complemented by recent suggestions for future HUDs. One suggestion is for a postulated APPLE HUD which might be for VR and AR modes. The HUD is speculated to have 2 small high resolution screens on the inside of 2 glasses, one glass for each eye. What this allows is an avatar giant with binocular vision, with eyes wider apart than human eyes. The allure is that instead of a user wondering what the avatar's vision is like, she could use a device like the APPLE HUD. The reader can note that the interplay between 2 separate hardware screens and a software VR input might be very dynamic.

The spider can make a related third person view when it jumps to the room. It knows it starts in a first person FoV. It can spin up a thread or process of the spider that is outside the FoV, at some distance like, say, 10 m. As the avatar moves thru the room, the third person FoV automatically follows. Since the spider is likely to be a ghost, it is a simple coding task to let the spider follow the avatar's coordinates at some specified distance.

Whether the spider will follow the avatar to other events on other days is up to the spider server. If the avatar seems to be in an "interesting" crowd, the server might deem it worthwhile to do so.

FIG. 5 shows a room 501 containing spider 502 and avatar 503. The spider has server 505. Doris 504 controls the avatar. She sees thru its FoV 506. The spider also sees this FoV 506. The spider has a second FoV 507. The 507 is under the independent control of the spider, while FoV 506 is under Doris' control. The $ going from Doris to the spider server designates her paying the server to record her activities in the room. While the spider 502 is shown in the room, if it is a ghost spider, users typically will see no indication of the spider.

When the avatar has the spider watching thru the avatar's eyes, the user controlling the avatar might be able to disconnect the spider. In this case, the spider might be able to fall back to using the third person view from outside the avatar. The user might want more privacy when interacting with others in the room.

Whether the spider is watching thru the avatar's eyes (first person) or externally (third person), the user might be able to send text messages or audio messages to the spider. She might be explaining why, for example, she decided to look at a scene in the room. Or why she is or was or will be talking to some avatars. Maybe those avatars were interesting done with their skins? Or maybe she had never interacted with the avatar before? The spider can record these messages and archive them as possibly useful content for future searches. This also has the effect of making the user "sticky" vis a vis the spider. If a user invests time in interacting this way with the spider, she is saying that her messages are significant to herself at least. And possibly to others later.

Separately, the user of the avatar might have followers (like currently in Web social media). She might be messaging comments to them as she moves in a room, and broadcasting what she sees and the messages to them.

If the spider is watching thru the avatar's eyes, the spider can make the analogous decision to disconnect from the avatar. The avatar might be able to detect this and tell its user. Especially if the user is paying the spider to watch thru her avatar, she needs to know, to prevent her paying the spider for a service it is no longer providing.

In some cases, the user does not need to pay the spider server to watch thru her avatar's FoV. If the user has a video data feed interesting enough to the spider server, the server may not need payment. Taken further, the server might pay the user for the avatars she meets.

There is a place here for a feedback loop, where the user contacts the spider server. She can ask the server to rejoin her with its spider. She might offer the server a higher rate of payment as an extra inducement.

This can also happen if the avatar changes appearances, like for each room it goes to. The link to the avatar can be versatile enough to allow this.

This following of the avatar by the spider is a way for the spider to generate revenue from the avatar user. She might be willing to pay for this. It is roughly like the way some current users of the Web have blogs of their activity. For example; INSTAGRAM (owned by FACEBOOK/META) is noted for users posting photos of (eg) visually interesting objects (often including the users themselves). This section uses that trend.

6: Promoting the Metaverse to Users;

As the Metaverse starts ramping up, it can struggle to get acceptance. One issue is that for VR, the HUD headset gigs can be expensive. Thousands of dollars. But there are hundreds of millions of users with smartphones that might cost $US500-1000 each. The viral success of Pokemon Go was caused by smartphones with a wide user base, and that the game could be played on smartphones.

FIG. 6 shows a large flat screen 601 in the real world, controlled by a Metaverse server 603. The screen 601 shows q QR code. A user Lucy with a smartphone 602 is nearby and scans the barcode with her smartphone camera. The code is automatically decoded to an URL, and the webpage pointed to by the URL is loaded and shown on the phone browser in FIG. 7. The Metaverse server is also the web server for the URL. The server acts to control 2 devices: Lucy's smartphone and the big screen 601. The server sends a webpage Controls 702 to the smartphone. The soft buttons and perhaps other widgets in 702 are equivalent to the hard buttons in a HUD rig used to control an avatar in a room in the Metaverse. Screen 601 now shows the room. There is avatar 701 which might represent an avatar controlled by smartphone 602. The avatar is bracketed by vampire 703 and wolf 704. The scene is a third person rendition of the avatar's situation, as opposed to a first person depiction of what the user would see thru the avatar's eyes.

The viewing of the big screen 601 by the smartphone user is not the immersive VR experience found by wearing the HUD, which gives a wrap around of visuals. But this disadvantage is compensated by the immersive experience of watching a large flatscreen. Plus the screen can be viewed by others nearby while the user of the phone controls her avatar. This addresses one current drawback of VR. The viewing of a VR room is largely limited to users of HUDs. Now several people can watch an approximate VR Metaverse experience. Plus the owner of the phone has a very simple way to connect—merely by scanning a barcode shown on the big screen.

The use of a QR code is non-limiting. A Data Matrix code might be used instead. Or any other type of 2 dimensional barcode or 1 dimensional barcode.

Figure 7:
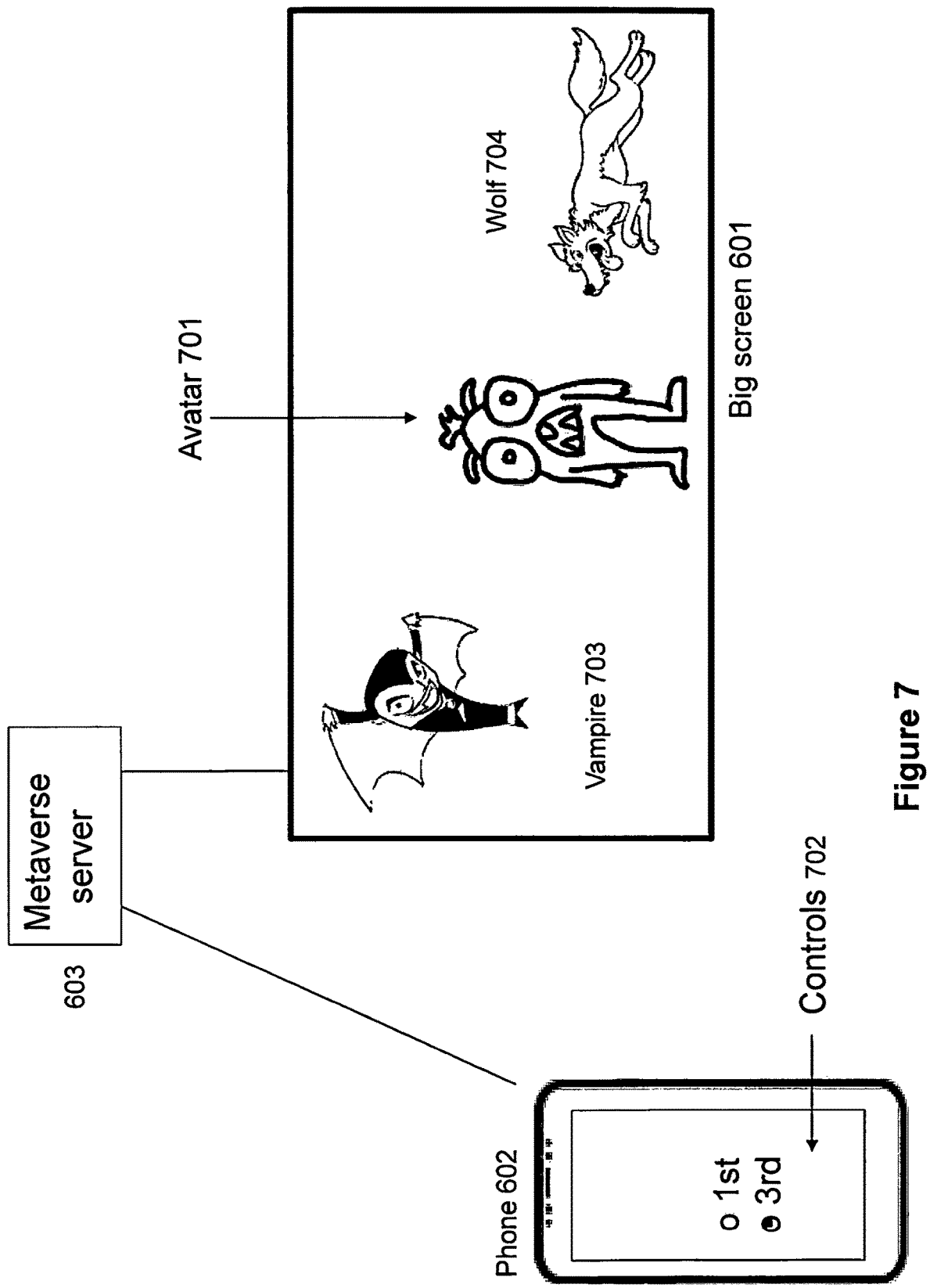
FIG. 7 shows a phone controlling an avatar on a nearby large screen.

A variant of FIGS. 6 and 7 is where the barcode scans and leads the phone to show a page that is mostly 'read-only'; where the avatar is being controlled by another user ('Tim') who is NOT the user of phone 602. Tim can be controlling the avatar via a full HUD rig.

The VR scene in FIG. 7 is of a 3d environment. The control buttons in 702 can let the user of the phone 602 have extra display opportunities, if Lucy is just watching, compared to Tim who is actually playing. Tim most likely is seeing on his HUD a first person FoV. While he is doing that, the controls 702 might have 2 radio buttons—"1st" and "3rd". Only 1 choice is possible at a time. Lucy can pick "3rd" to show the scene in FIG. 7 in third person, while Tim plays largely in first person. When Lucy does this, she is not changing what the avatar is doing. So Tim remains in control.

For simplicity, FIG. 7 only shows the "1st" and "3rd" buttons. But more controls are possible on the phone screen.

Another variant is where, after Lucy scanned the barcode to get to FIG. 7, she can explicitly control where in the 3d environment she is watching in third person. She can control the (x,y,z) coordinates of the FoV to be shown in screen 601. Plus she can also control the azimuth (0-360 degrees) and elevation of the virtual camera showing the FoV.

As a practical matter, Lucy is largely doing this for the benefit of nearby viewers, whether Lucy herself is a player controlling avatar 701 or just a viewer.

FIG. 7 can be extended. It shows vampire 703 and wolf 704. They might be NPCs (bots). But. Say, wolf 704 might also be an avatar controlled by another human, Jim. In FIGS. 6 and 7, after the barcode is scanned by Lucy to give FIG. 7, this can still show a barcode. This might be a different barcode than what was shown in FIG. 6, or it could be the same. The barcode might appear as an overlay image in the upper part of FIG. 7. Jim is near the big screen. He scans the barcode with his phone. This decodes to a screen on his phone. Earlier when Lucy scanned the barcode in FIG. 6, she might have gotten a screen on her phone with 3 choices "view", "wolf", "vampire", and she chose "view". Now Jim might see on his phone the choices "view", "wolf" and "vampire". Jim picks "wolf". He now controls the wolf as an avatar; it is no longer an NPC.

Screen 601 splits into half. The left half is still controlled by Lucy. When she was controlling the entire screen, now the left half is redrawn. The right half is controlled by Jim. He can use his phone screen's controls to control the wolf.

As with Lucy, Jim's VR experience is not a full HUD experience. But Jim just needs a standard smartphone.

Above, we said that when Jim scans the barcode he gets a page with "view", "wolf", "vampire". If he picks "view", he is watching events, like Lucy. But he can now move to a different location in the VR and watch from there. For simplicity, FIG. 7 just shows 3 NPCs or avatars. But the room might have hundreds of these. Jim might well want to go and see other parts of the room. So an AR/VR scene might have 2 or more independent viewers. Each viewer might in turn have others watching the scenes offered to the viewer. And as, say, Jim moves his avatar to a new location, others watching "his" large screen follow along.

Suppose a firm makes or sells HUD rigs for VR or the Metaverse. It wants to garner awareness of its products. The large screen might be put in the window display area of a store. The screen faces the street. Passerbys can use their phones to scan the barcode and see and control activity in a Metaverse room. The big screen might be expensive, so to avoid vandalism, it is placed behind the shop window.

The use of phones to scan the barcode can also get around a limitation of putting the big screen behind a shop window. The window cuts off any sound emanating from the big screen. Large screens are commonly sold with large speakers, to play TV or video. But putting the screen in shop window obviates this. Now a user, Lucy or Jim, standing outside the shop, can get audio from their phones. So they can see and hear changes to the scene. For others who are standing nearby, if they have phones and the big screen shows a barcode after Jim scans the barcode, the remaining visible barcode can lead to an URL for an audio feed.

Look again at FIG. 7. Imagine a barcode in the upper part of the big screen 601. Now a nearby user Doris scans it. She gets a screen like FIG. 8, item 801. The figure shows 5 large screens, 802-806, at various cities globally. Each is controlled by the same Metaverse server. Doris' phone acts as a master controller. Her screen shows a partial list of users who have used their phones to scan barcodes on the large screens, to control an avatar. The avatars can all be assumed to be in the same room.

Doris can use her phone to control various aspects of each user's interactions in that room. Including being able to enable or disable each user. For simplicity, the GUI aspects of this are omitted from the figure, but these are easy to imagine. One example is for each user, to have a 2 state button, that can toggle between enable and disable.

A variant is where the avatars can be in different rooms. And if different rooms are possible, the list of users in FIG. 14 might be grouped by rooms.

For simplicity in explaining, earlier we said a user can use her phone to scan a barcode on a nearby big screen, to control an avatar or just watch. We omitted any intermediate step about logging in, or associated permissions. Such can readily be imagined and inserted into the control flow as needed.

Much current hardware development activity on HUD rigs for VR focuses on the lower level details of what the user sees in the HUD. FIG. 14 looks at a higher level of system integration and control. Realistically, for a room with many users, control would likely be exercised by a user using a PC or laptop rather than a smartphone. But we show here how the latter might be used.

7: AR/VR and Metaverse and Websites;

This application described several ways to help build out the Metaverse. But more generally, all of these are also germane to VR and AR. Plus also to developing websites and mobile apps. For example, FIGS. 7 and 8 also pertain to "conventional" such websites and mobile apps, where the users do not need to use AR or VR HUD rigs. Just as those figures were depicted in a 2d page environment of this specification, this also means that that webpages and mobile apps can be built mimicking those figures.

8: Detecting Trademark Violations;

Already problems have surfaced in the nascent Metaverse. One is fake ads or endorsements. When a user enters a room, she might see ads using the names of well known firms. Perhaps accompanied with images of products from those firms. There is suspicion that some sites are faking the implicit endorsements of the firms. That those large real life firms have no idea they are being infringed.

FIG. 9 is a flow chart detecting trademark infringements. It can be used by a spider at a VR site. The site might be depicted as a shopping area, indoors or outdoors. Item 91 is the spider detecting and scanning a shopfront or billboard. Or scanning a video being shown. The spider uses well known OCR methods to find a trademark. If none, then go to item 90, where the spider goes to another shop at the site. If a trademark is found then go to item 93.

The spider sends a message to the trademark owner. The message can link to a snapshot of an image of the trademark and shop with the trademark. The message can have a link to the site and a timestamp of when the site was visited. The message describes the firm running the spider and asks the trademark owner if the use of the trademark was authorised.

If the owner replies yes the go to item 96. The spider can maintain several internal counters. One counter is for the shop. It is incremented when a valid use of a trademark is found. If the use is unauthorised, the counter is decremented in step 95. We go back to item 90 and move forward.

Note that the use of the incrementer "++" in item 96 and the decrementer "--" in item 95 are not limited to just incrementing the count by 1 or decrementing the count by 1. There might be more detailed reasons to increase or decrease by larger amounts. For example, if an unauthorised trademark is detected, and it is owned by a very large firm, the decrementing might be by larger than 1. Or if the unauthorised use is in a large billboard in the VR space, the decrementing might be by larger than 1 to reflect a more visible and blatant violating of the trademark. Compared to a violation where a trademark was on a flyer of A4 size, which is of lesser area. This latter case might just cause a decrementing by 1.

A more intricate method alters FIG. 9. Look at item 95. When an unauthorised use of a trademark is found, do not do a simple/simplistic decrement. Instead, whenever this is found for a given shop, then set a flag bad=true. And record the trademark and trademark author. A given virtual shop might show several trademarks. Some authorised, some not. The crucial thing is if any unauthorised are found. This also leads to an enhancement of FIG. 9. Since a shop might show several trademarks, the figure can be extended to having an inner loop for a given shop. The loop is for searching for trademarks in the shop. This can imply the spider entering the shop to search.

This also might trigger a countermeasure by an infringer. Who might place infringing items inside the shop. A spider has to enter the shop. The shop might bar ghosts. Perhaps by having a (virtual) door that needs to be opened by an avatar, whereas a ghost might not be able to do so. (Whether this is true can depend on the specific rules of the site.) Here is a need for the spider to instantiate as an incognito avatar.

The shop might also have an anti-spider countermeasure of asking a visiting avatar to do a Turing test, like a Captcha test. These are now well known on websites. The test here is to guard against any automated avatars. If the authomation of the spider cannot pass the test, the spider might trigger a call to a human supervisor to take over the doing of the test.

Another scenario is where the trademark is owned by a firm that has is reputed for aggressive protection of its trademarks. This might impute a greater decrementing than 1.

When the spider has done this for the entire site, it can do a meta step, so to speak. If the site has several trademark uses found to be unauthorised, this can speak badly for the site. The shop counters for each shop can be combined in some manner to find an overall metric for the site.

The spider is assumed to work for a server firm that is doing a search and ranking for VR sites. A high metric for the site can push the site up in search results; all else being equal. But if a site has several unauthorised uses, the site can be severely deprecated.

A further step is a way for the search engine to add more value for users. When a user visits the site, she might have a way to see search results for the site on her HUD or mobile app or browser. The spider server can show a rating for the entire site, based on its above analysis of shops on the site. She can see for a given shop, a graphical indication that it is showing a fake (=unauthorised) trademark. To do this, the spider might have on an earlier visit also recorded the coordinates of each shop.

This can greatly help users concerned about the validity of sites they visit.

Thus far, we conflated the site and the shops on it. We assumed that these are all lentity in the real world. But a site might act like a real world shopping mall. The shops on the site are run by other entities. The methods here can help the site against bad shops. The spider server can sell its services to the site to regularly surveil its shops.

8.1: Trademarks at a US State Level;

In the US, trademarks and service marks can be obtained at the state level. One case that might arise is if the real world entity that runs an AR/VR site is in a given state. The spider finds which state. Prior to analysing a site and any shops in it. The spider can test a detected signage against the state's trademarks. If it finds a potential infringement, it can do the earlier steps against the shop or site.

Another issue arises with AR. For example an AR activity might be done in the actual town of Sacramento Calif. During the activity, users move around town and use an AR app showing overlays on a background of the real Sacramento. If the spider is able to scan the images made by the app, it can find any signage and trademarks therein. It can test if those trademarks are also trademarks in California, irrespective of whether they are at the US federal level. If the spider finds that a California trademark is being used, it can do the earlier steps.

FIG. 9A shows a flow chart of the above. It generalises to other states.

A variant of FIG. 9A is to recognise that in a given run of an AR app, the user might not cover all the virtual signage in the app. So the spider does not do a full analysis of the overlays. But if the spider can run on other instances, this can be handled over time.

Another variant is when the firm writing the AR app interacts with the spider firm. The AR firm can let the spider firm spider the app in a way to examine all the signage. The spider can test these against trademarks in all the US states that the AR firm hopes its app will be used.

9: Zombie Avatars;

A problem is that when users get avatars and visit a site and then go inactive. They might just walk away from their HUDs or other computers, without actually logging out from the program they are using. This can lead to their avatars being zombie-like. A zombie avatar will be static and non-responsive to (eg) an active avatar sending them a message or bumping into them. The active avatar might also bow to the (presumed) zombie avatar. Or the active avatar might jump up and down. The active avatar might also do other actions, or combine these actions.

A zombie avatar is intermediate between a regular avatar that is actively controlled by a human, and a Non Player Character. An NPC of a dog, say, is a computer program that controls a computer model and skin of a dog. But the NPC is unlikely to ever be directly controlled by a human.

There is incentive for a site to allow zombie avatars, to gin up attendance. A casual visitor to the site will then see plenty of avatars even if they are dormant. A ghost spider can add value to users with avatars in VR or the Metaverse. And a user who runs and leaves an avatar dormant in a room might activate another avatar (under a different alias) and move it to that room, in a deliberate boosting of attendance. The user might be acting for herself, to perhaps boost attendance in that room if, say, she is actively performing music or speaking in the room. Or the user might be working for the room.

An analogy is with social media on the Web. There is now a well known phenomenon of fake social media accounts, letting nefarious people hide behind these while promoting fake and offensive posts. We anticipate that users with avatars will find willing AR rooms that let the users park their avatars, to gin up attendance numbers for the rooms.

There is an opportunity for a spider to add real value to user experiences in VR by surveiling such rooms and pointing out zombie avatars. It can also help encourage a Metaverse/VR etiquette of users not leaving their avatars in a VR room and walking away in real life for several hours.

The zero-th level zombie avatar is one that remains still at a location, without even moving its arms. To detect this with reasonable confidence, a spider can do a quick scan of a room. It can take photos and estimates of the (x,y) of many or all avatars in the room. It might goes to another unrelated room and do other spidering tasks. It comes back to the first room. It finds any avatars that have not moved significantly, if at all. These it can tentatively mark as zombie avatars.

FIG. 10 shows a way to detect zombie avatars and to use this. Item 1001 is the spider taking photos of avatars in the room. Item 1002 is the spider going away and item 1003 is the spider returning. This time interval might vary between multiple trips by the spider to that room, or for other rooms. The spider could deliberately introduce a stochastic element to keep a rogue room guessing.

Item 1004 is the spider taking photos of the room when it reappears. It compares these to the earlier photos and finds suspected zombies that did not move, or moved little, in item 1005. the spider records the location and images of the suspected zombies.

At some later time, a user visits the room in item 1006. The user likely has an avatar, but she might be a ghost. The user accesses a connection to the spider server. Or it might just get data from the server. Item 1007 covers both cases. The spider does not need to be in the room when the user appears. This is akin to on the Web, when a user goes to a webpage. The latter has been spidered at some earlier time.

When the VR user scans the room, she is looking at her FoV. Item 1008 is where if this has a zombie avatar, the FoV marks it in some way in item 1009.

FIG. 10 can be elaborated.

To test a zombie avatar, the spider can ask it questions. This assumes the spider is able to do this, and that the avatar is able to answer. The first assumption can be made true by deliberate design of the spider. The second is likely to be true, because an avatar that cannot get and send messages to arbitrary other avatars is very s limited.

A possible objection arises. An avatar might be designed to only accept questions from another avatar. If the spider is a ghost and this is true about a nearby avatar, the spider might have to instantiate as an avatar in order to ask a question.

This can escalate. An avatar might be deliberately designed to try to fool the spider. If the spider runs an avatar, the spider might not want its avatar to self identify as a recognisable spider. An avatar might have a name. The spider can choose a common name for its avatar. And the spider might take on a different appearance the next time it appears in the room. This can especially be done in the context of the earlier actions, where the spider first surveils the room. If it appears as an avatar, then when it goes to another room and comes back, it might appear as a different avatar. Plus, if in the spider's first appearance, it is an avatar that appears at several places in the room, in the second time, as a different avatar, it might appear at different places than in the first time.

Now that the spider gets to ask a question of a suspect avatar, there are 2 possibilities. If the avatar does not answer, this increases the chance that its owner has gone elsewhere, and so it is dormant. The spider can indicate this state for the avatar.

But suppose the avatar sends a reply. The ghost might ask another question . . . etc. The reader will recognise this as a de facto Turing test. Where the questioner (spider) is likely to be a bot in its own right.

The spider perhaps should not ask the same questions to different avatars. The spider can store a set of many common conversational questions. Perhaps if a room is for, say, sports fans, the questions could be geared likewise.

If we leave the situation in the previous paragraph aside, then just being able to identify the silent avatars as zombies is progress. This data can be made available to visitors to the room, to give some information about some of the room's avatars. This undercounts the actual number of zombie avatars, but it can be done quickly.

The spider's avatar might occasionally stumble near or even slightly collide with an avatar. To try to elicit a response. Here is a possible complication. We can expect avatars to be often designed with some level of automatic anti collision, even if the avatar is under active control. So if the spider avatar does try to collide, the zombie might just step aside to avoid, and the latter is not enough indication of no active control. However, if the avatar is actively controlled, its user will likely say something. So if the avatar does not, this can be a red flag.

Or the spider avatar can be more subtle. Instead of colliding, it might do handstands near the other avatar. Or jumping jacks. Or twirl a parasol. Etc. If the user is active, she would likely say something.

FIG. 11 is extra detail that was not in FIG. 10. It expands on item 1005. Item 1102 is the spider asking the avatar some innocuous question. If there is no reply, the spider can classify the avatar as a zombie in item 1004. If there is a reply, the spider might collide with the avatar in item 1005. Item 1106 tests if there is no reply (even if the avatar moves) then the avatar is considered a zombie. But if there is a reply then the spider might consider the avatar to be manned. But if the spider wants to do more tests, it does item 1107. Leading to a query 1008.

FIG. 11 is intended as a first level approach to finding zombie avatars. More intricate methods can be envisaged.

Consider a new user who has an avatar and uses it to visit the room. If the user can access the spider server, the latter can show an "overlay" of the room, and the overlay indicates which avatars are zombies. At the very least, the user can avoid trying to talk to the zombies. She can confine her attention to the avatars which are (presumably) actively controlled by humans.

Also. The spider server can help deflate fake attendance records for VR or Metaverse rooms, and so help advertisers and others wanting valid data. The anticipated or suspected connivance of rooms in tolerating zombies is why a spider cannot or should not expect to simply be able to ask a room for the locations of its current avatars. The room might have little incentive to comply with accurate data that lets the spider easily see which avatars are moving.

Given the spider's detection of zombies, the spider might let a user go to suspected zombies. She might be outside all rooms; perhaps just seeing a null screen on her rig. It can let her search for rooms, and show a list of zombies in such a room. Or she might already be in a room and wants to search for these in the current room. Her rig shows a list of images of such, perhaps with ancillary data like their nicknames. She picks one. The rig takes her to near that avatar's location. This is the last location that the spider saw the zombie at. And she is presented with a third person view of the zombie. She can attempt to test the zombie for herself.

10: Optimising a VR Room Showing Video;

FIG. 12 shows 3 users (Carol 1202, Lyn 1203, Tim 1204) watching a video from screen 1201 in VR room 1200. The figure is in projection mode onto the horizontal plane. Each user has an avatar, through which she sees the video. The arrows from the screen to the users indicate what they are seeing through the fields of view of their avatars.

There is a simple but fundamental difference between watching in real life and watching in a virtual reality room using avatars. Suppose FIG. 12 depicts a room in real life. The screen is showing a video and Carol, Lyn and Tim are watching it with their biological eyes. The room contains a physical screen playing the video. The room has a computational cost and an electric bill in doing so. This cost is the same whether there are 3 people watching it, or 10 people watching it, or no one in the room. Each person watching with her own eyes captures photons coming from the screen to her eyes. If she is not present, those photons are still generated and emitted by the screen.

In the VR room of FIG. 12 it is very different. The VR room is not a physical room. For each avatar, the VR room has to compute the image seen at the avatar's FoV. The originating scene is the same for all avatars, but each avatar is at a different FoV. The VR room has a computational cost roughly proportional to the number of avatars in the room with a direct line of sight to screen 1201.

This is different from streaming video, where the same video is copied and sent to many real viewers. In FIG. 12, for each avatar, a unique image has to be found. For scenarios where a VR room has avatars watching a video shown in the room, it would help make this practical if the computational cost could be reduced.

FIG. 13 is a flow chart of one method to do so. Item 1301 is where a video is shown in a VR room. Item 1302 is the room finding the users/avatars that are watching the video. The room can do this because it has to know who these users are, because it has to make the FoV for each such user.

Item 1303 is the room sending a message to each user, asking them to watch the video outside the VR room. There may be cases where for what the users are gathered in the room for, where this is not possible. We assume here that the users can indeed watch the video outside the room.

Item 1304 asks if the user has 2 screens in her hardware. The main anticipated case is where she is wearing an AR/VR rig that has 2 screens. One screen for her left eye, one screen for her right eye. We anticipate that some VR makers will make such a rig.

Given this, item 1305 has the video being shown in 1 screen directly from the video source. Suppose the video is coming from Youtube. The user arranges her rig so that in (eg) her left screen, it shows the video. Item 1306 shows the VR being made for her by the room in her right screen.

Item 1307 has her telling the room that she is directly watching the video. This video comes from Youtube to her rig, without going thru the room's server. It assumes that when she uses her rig in this way, the data feed to her left screen can be set independently of the data feed to her right screen.

Item 1308 uses the crucial fact that her FoV (which is made by the room) that shows an image of the screen in the VR room, can simply make the screen blank. Because she gets the screen info in her first screen.

Variants of the above are possible. The above can be done for each user who is agreeable. For users who do not have 2 screens, if they watch the video depicted by the room's screen, the room does not have the computational load of the users who do have 2 screens each. So the room may be more responsive to these users.

To encourage compliance, the room could reward users with money or pseudo-currency.

The above was for pre-recorded video. But it is also possible for video being filmed live.

I claim:

1. A method of a search engine spider ("spider") interacting with a virtual reality (VR) room and a user;
the spider adapted to visit the room;
the spider visiting the room;
the room having one or more avatars;
the spider taking a first set of photos of the room;
the first set containing images of one or more avatars;
the spider leaving the room;
the spider returning to the room;
the spider taking a second set of photos of the room;
the spider finding a third set ("zombies") of avatars;
the zombies consisting of avatars in the first set and in the second set, where the avatars had not moved between the first and second set, as discerned by the spider;
the user visiting the room using a VR rig;
the rig getting data on zombies from the spider;
the user interacting with avatars that are not zombies;
the spider gets from the room a count of avatars in the room;
the spider computing an amended count being the count minus a number of avatars in the zombies;
the spider publicizing the amended count as an attendance count of the room.

2. A method of a search engine spider ("spider") interacting with a virtual reality (VR) room and a user;
the spider adapted to visit the room;
the spider visiting the room;
the room having one or more avatars;
the spider taking a first set of photos of the room;
the first set containing images of one or more avatars;
the spider leaving the room;
the spider returning to the room;
the spider taking a second set of photos of the room;
the spider finding a third set ("zombies") of avatars;
the zombies consisting of avatars in the first set and in the second set, where the avatars had not moved between the first and second set, as discerned by the spider;
the user visiting the room using a VR rig;
the rig getting data on zombies from the spider;
the user interacting with avatars that are not zombies;
the spider approaches an avatar in the zombies;
the spider interacts with the avatar;
the spider receives a message from the avatar or the spider sees the avatar move in response to an action by the spider;
the spider removing the avatar from the zombies.

3. The method of claim 2, where:
the action by the spider is one or more of
(a) the spider collides with the avatar, (b) the spider jumps near the avatar, (c) the spider waves at the avatar, (d) the spider bows to the avatar.

4. A method of a search engine spider ("spider") interacting with a virtual reality (VR) room and a user;
the spider adapted to visit the room;
the spider visiting the room;
the room having one or more avatars;
the spider taking a first set of photos of the room;
the first set containing images of one or more avatars;
the spider leaving the room;
the spider returning to the room;
the spider taking a second set of photos of the room;
the spider finding a third set ("zombies") of avatars;
the zombies consisting of avatars in the first set and in the second set where the avatars had not moved between the first and second set, as discerned by the spider;
the user visiting the room using a VR rig;
the rig getting data on zombies from the spider;
the user interacting with avatars that are not zombies;
the spider is asked by the user for a list of zombies;
the spider furnishes the list;
a zombie in the list has a location;
the user picking the location;
the user jumping to near the location;
the user seeing the zombie.

* * * * *